July 27, 1965    J. R. URSCHEL    3,196,916
COMMINUTING MACHINE

Filed Aug. 4, 1961    12 Sheets-Sheet 1

INVENTOR.
JOE R. URSCHEL
BY
Charles S. Penfold
ATTORNEY

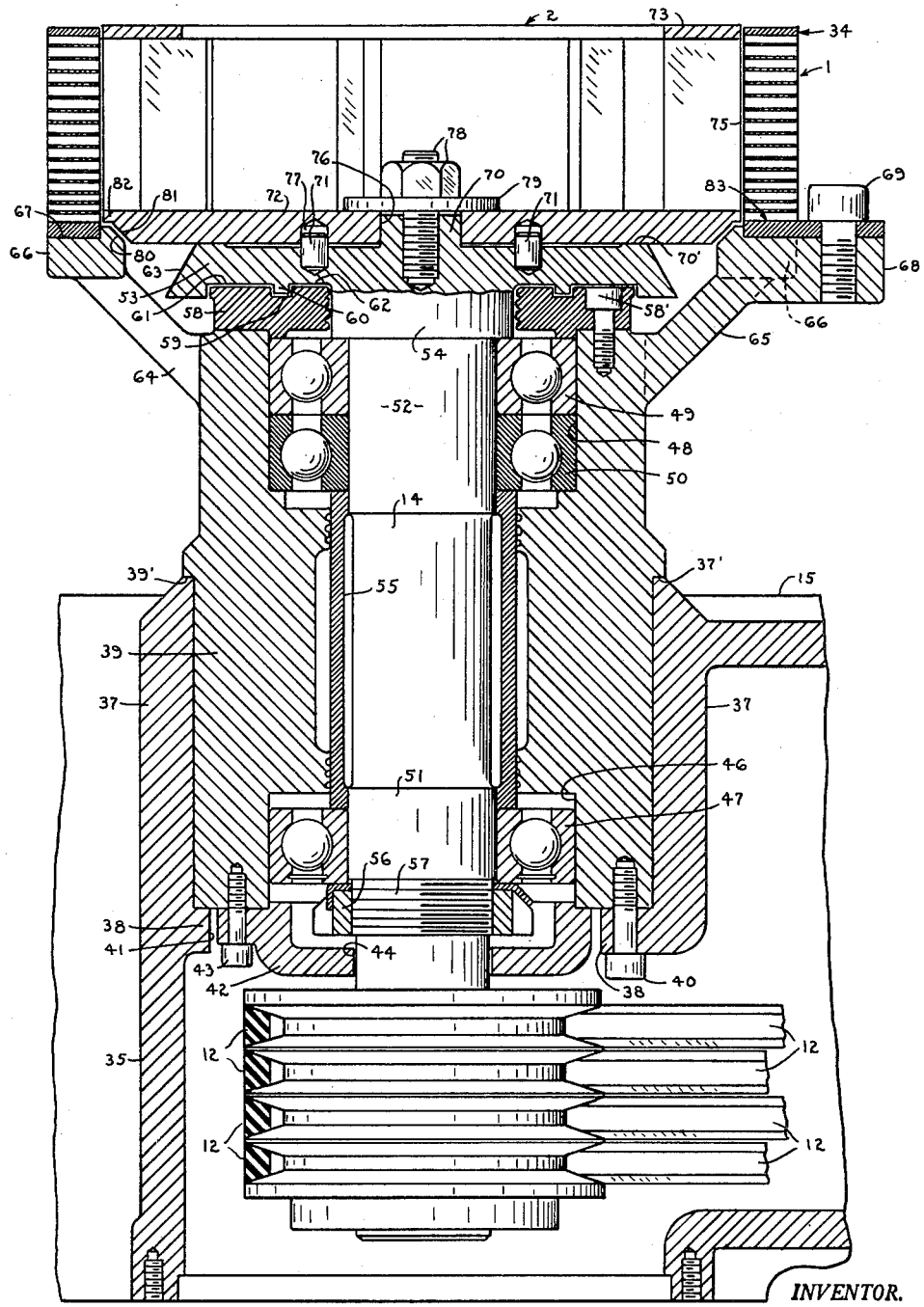

July 27, 1965
J. R. URSCHEL
3,196,916
COMMINUTING MACHINE
Filed Aug. 4, 1961
12 Sheets-Sheet 3
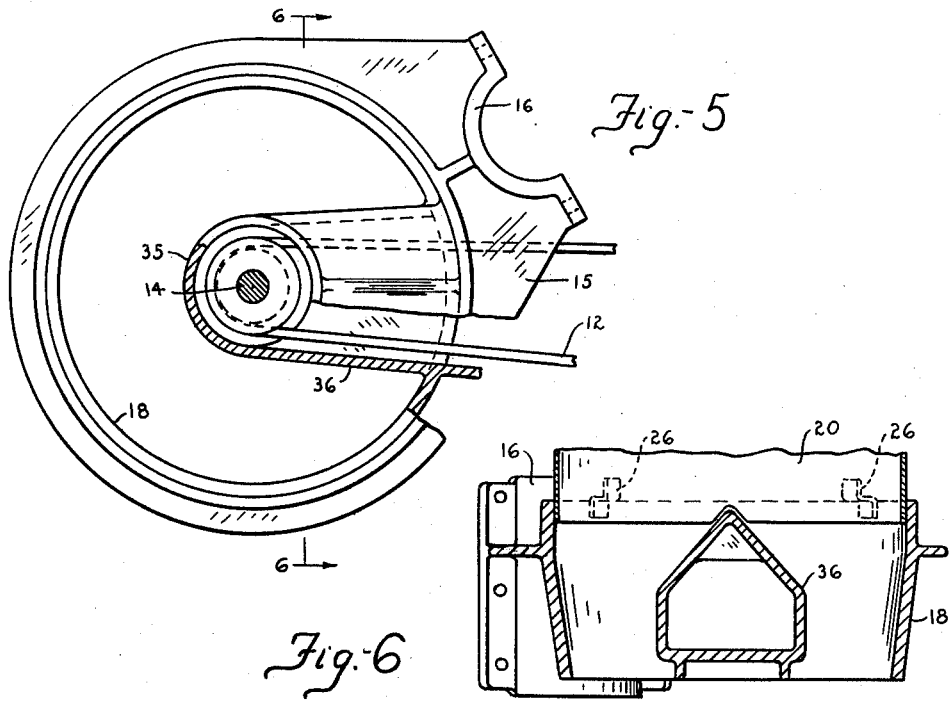
Fig.-5
Fig.-6
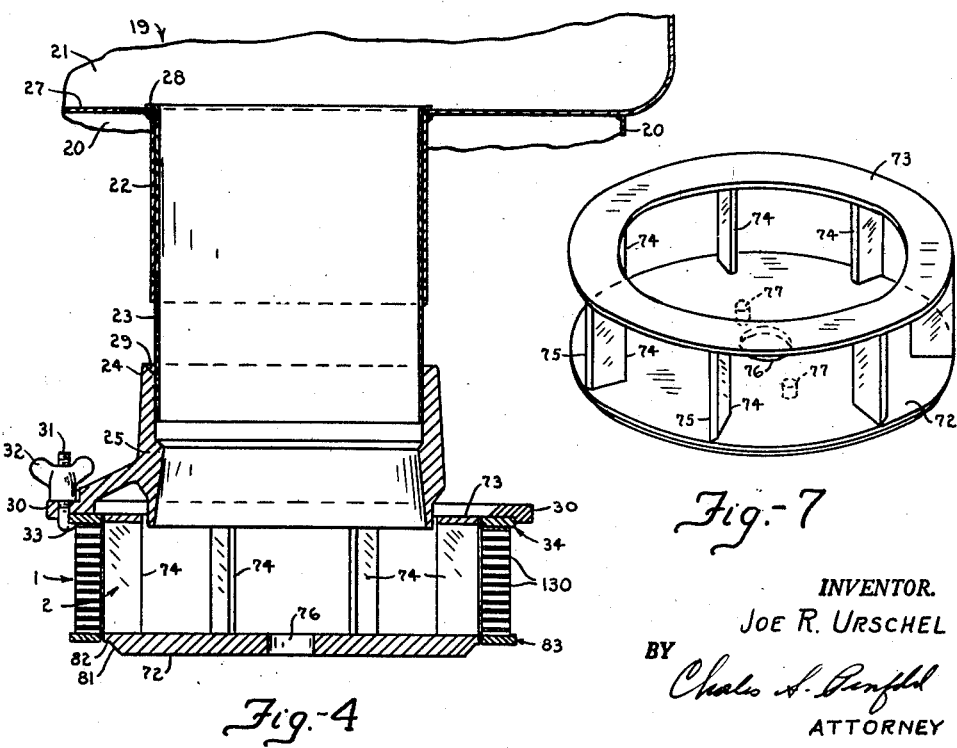
Fig.-7
Fig.-4
INVENTOR.
JOE R. URSCHEL
BY
ATTORNEY

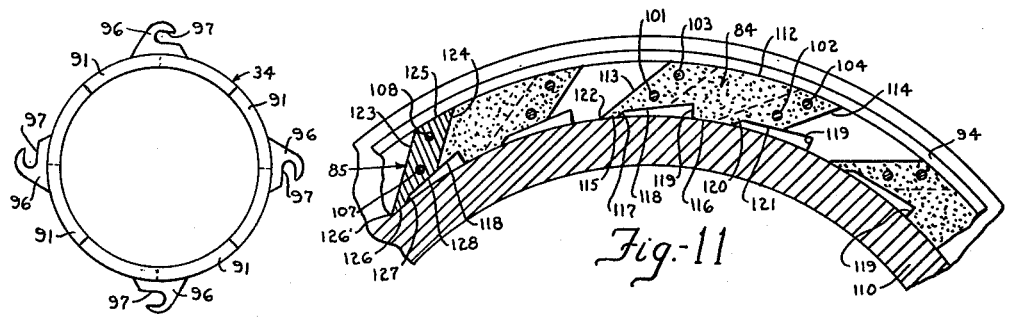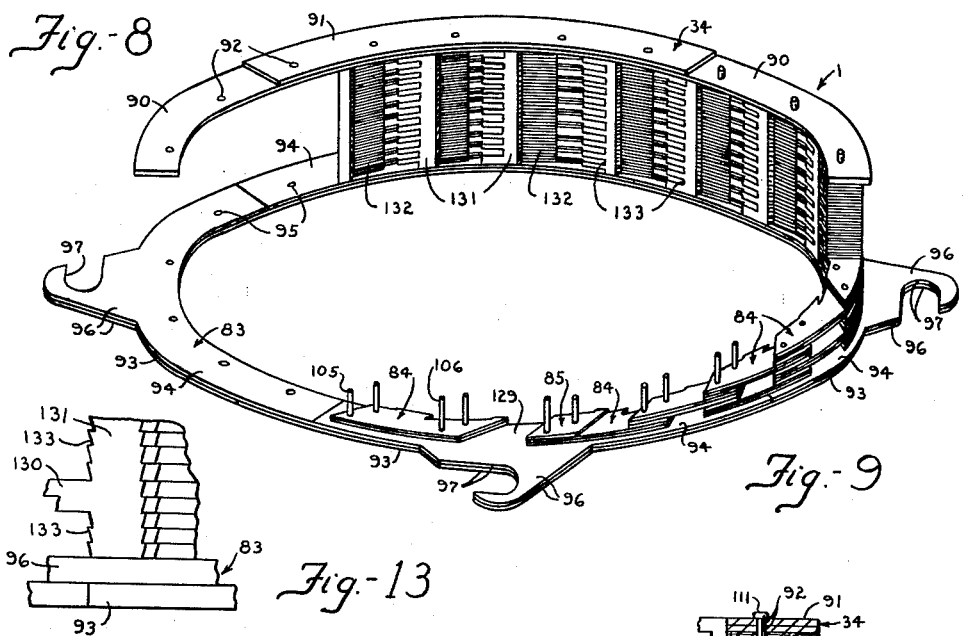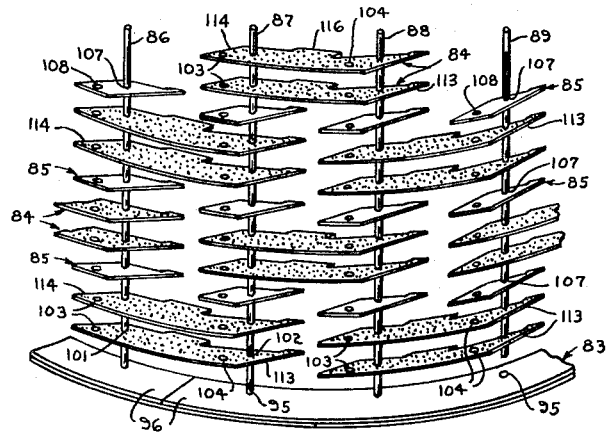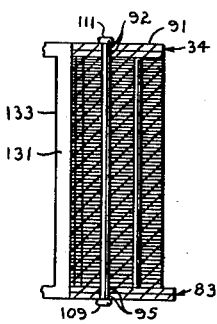
INVENTOR.
JOE R. URSCHEL
BY
Charles A. Penfold
ATTORNEY July 27, 1965
J. R. URSCHEL
3,196,916
COMMINUTING MACHINE
Filed Aug. 4, 1961
12 Sheets-Sheet 5
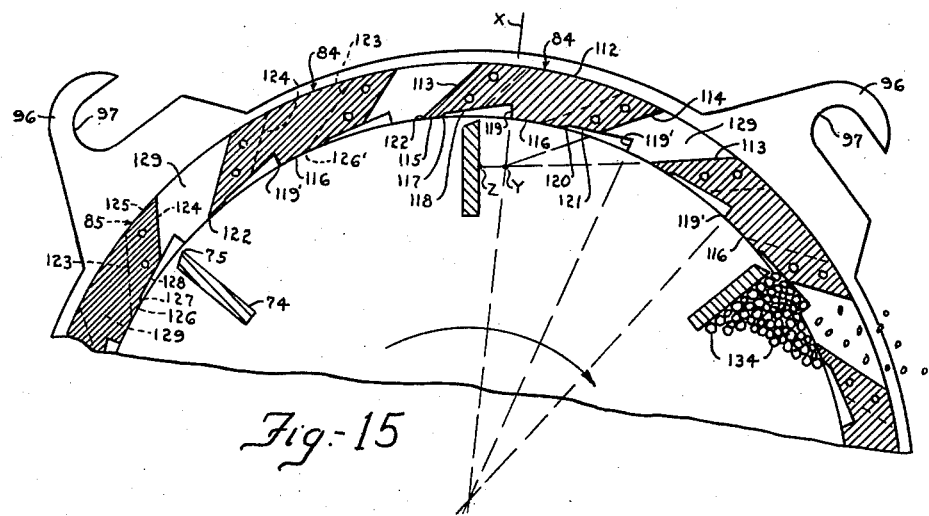
Fig.-15
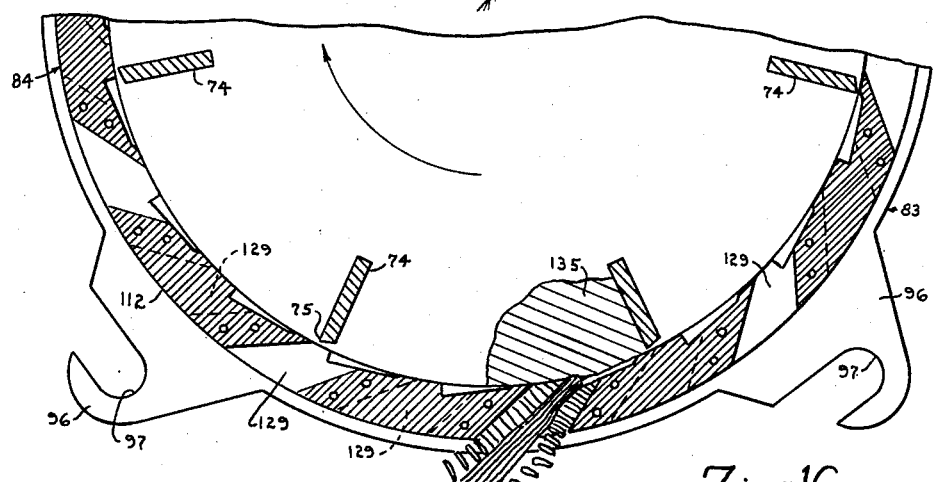
Fig.-16
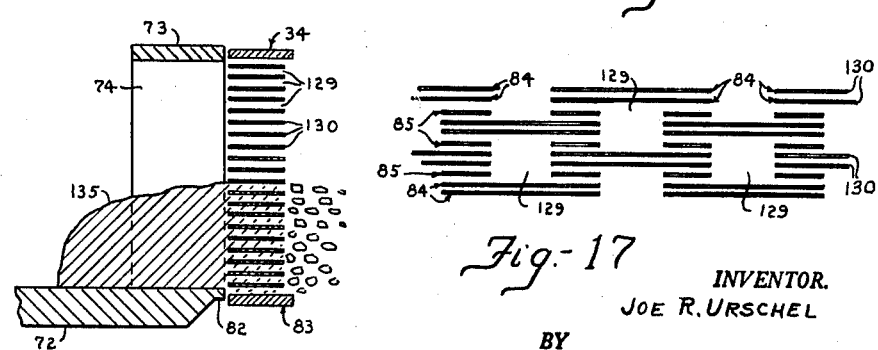
Fig.-14
Fig.-17
INVENTOR.
JOE R. URSCHEL
BY
Charles S. Penfold
ATTORNEY July 27, 1965  J. R. URSCHEL  3,196,916
COMMINUTING MACHINE
Filed Aug. 4, 1961  12 Sheets-Sheet 6
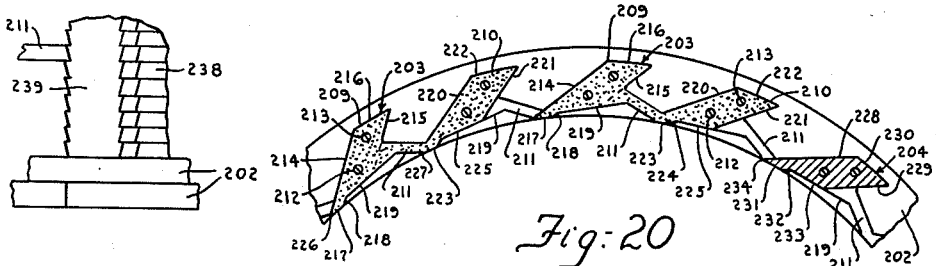
Fig.-22
Fig.-20
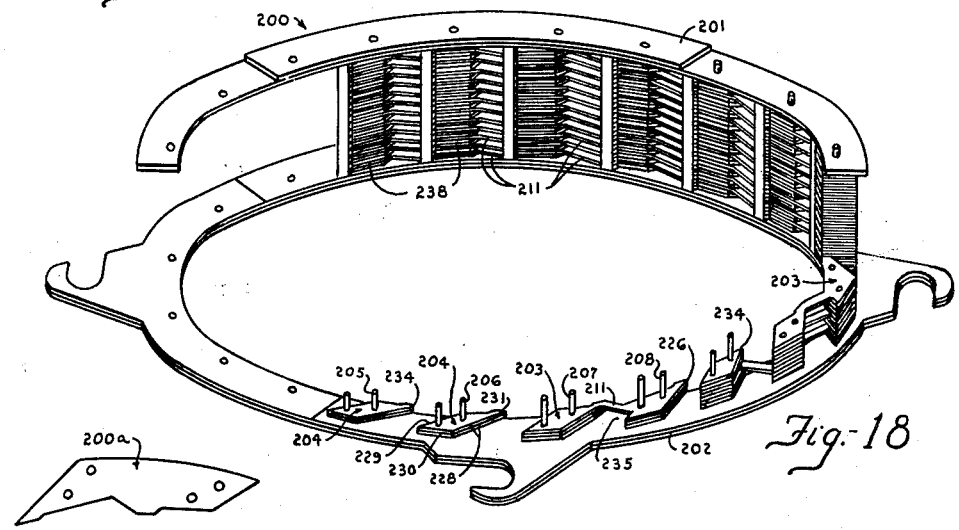
Fig.-20a
Fig.-18
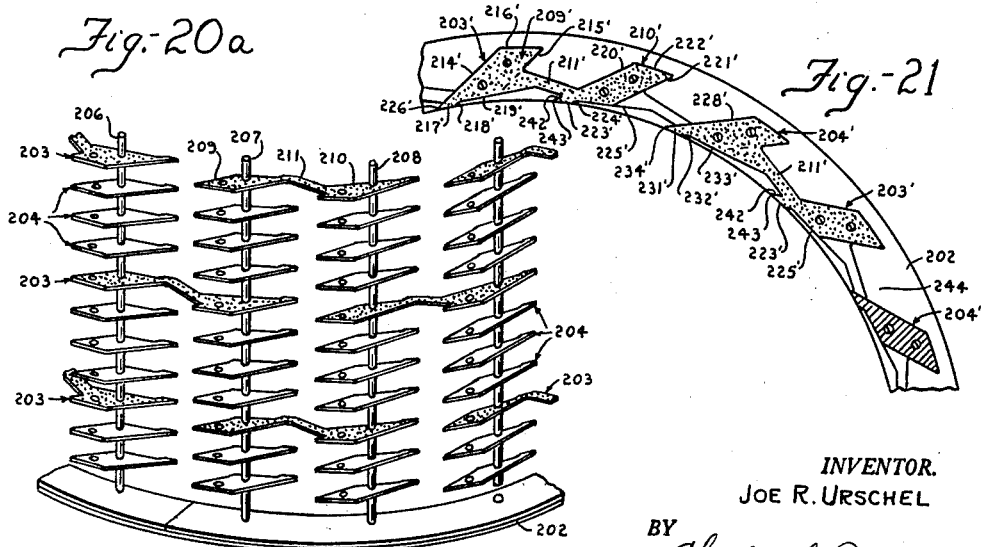
Fig.-21
Fig.-19
INVENTOR.
JOE R. URSCHEL
BY
Charles A. Penfold
ATTORNEY July 27, 1965                J. R. URSCHEL                3,196,916
                           COMMINUTING MACHINE
Filed Aug. 4, 1961                                    12 Sheets-Sheet 7
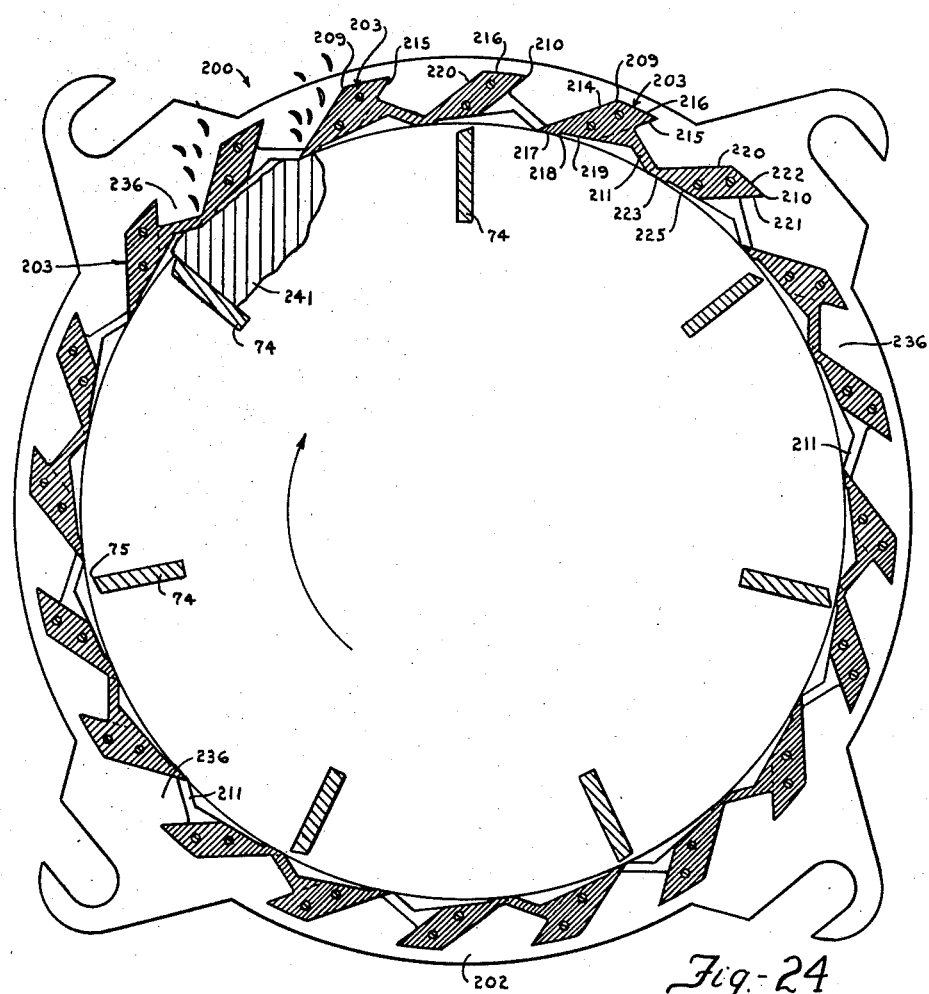
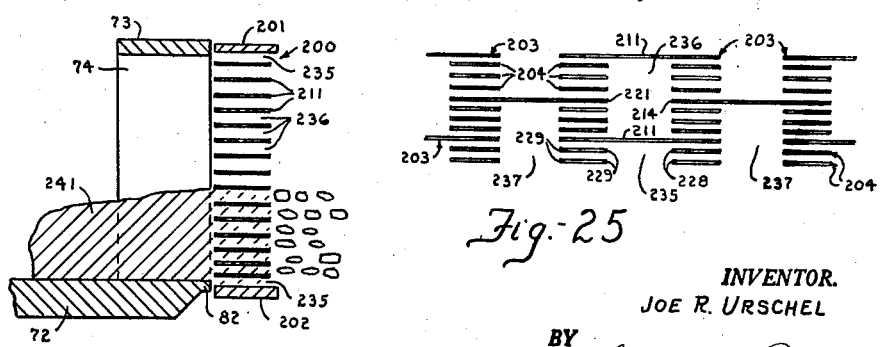
INVENTOR.
JOE R. URSCHEL
BY
Charles A. Renfold
ATTORNEY

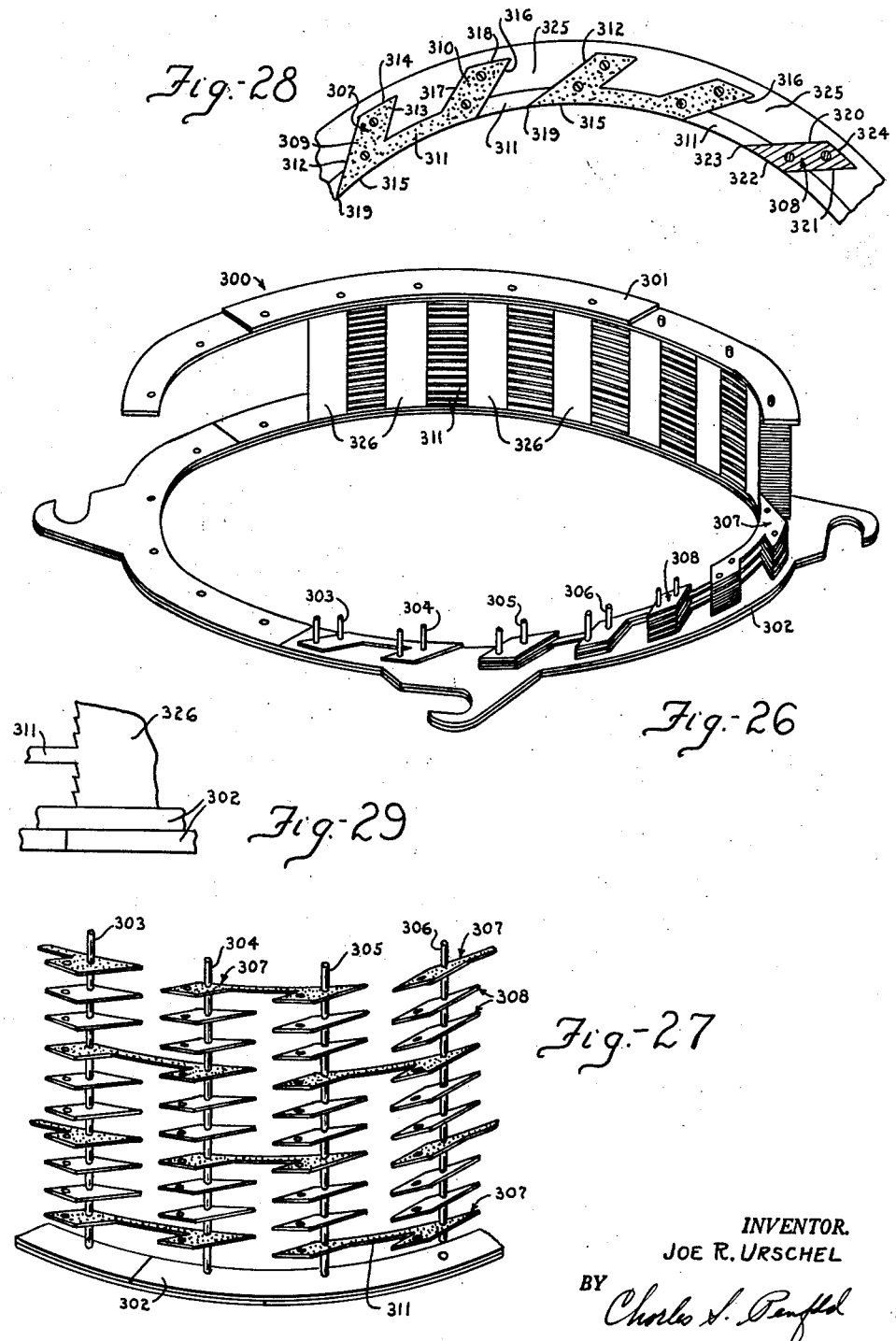

July 27, 1965 J. R. URSCHEL 3,196,916
COMMINUTING MACHINE
Filed Aug. 4, 1961 12 Sheets-Sheet 9

INVENTOR.
JOE R. URSCHEL
BY Charles S. Penfold
ATTORNEY

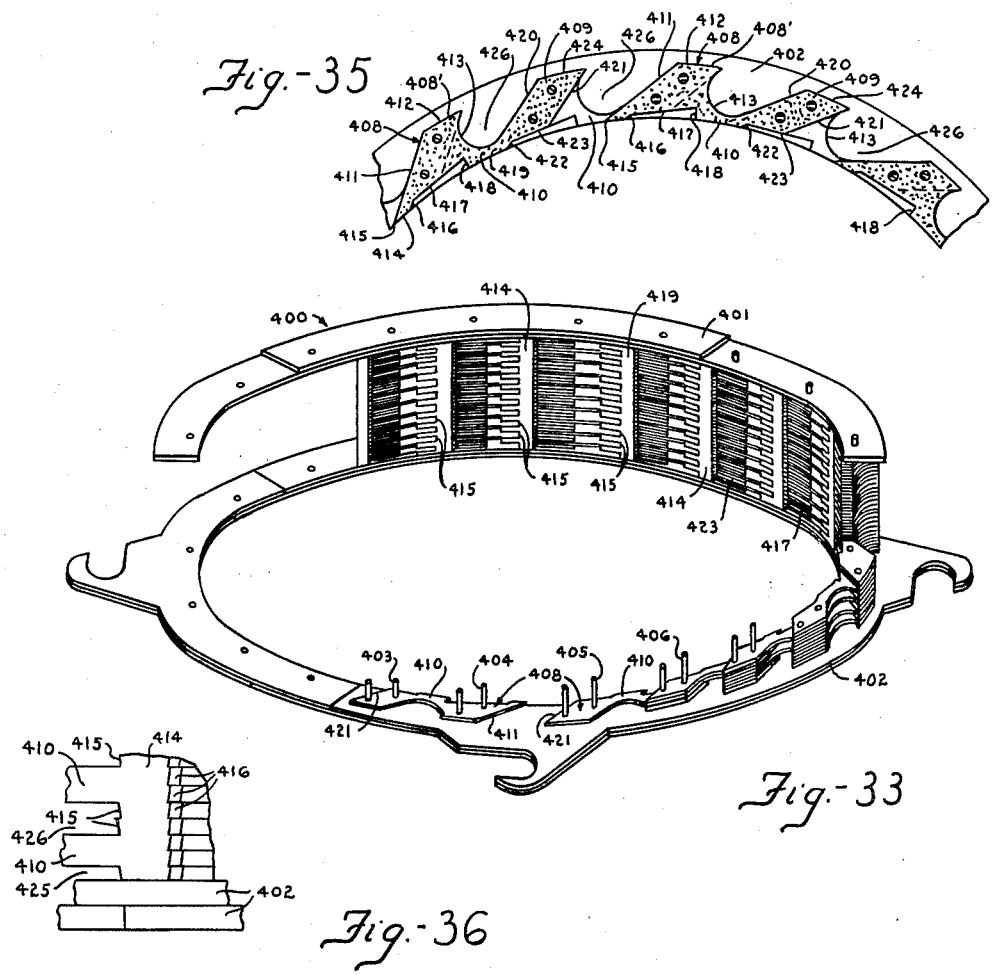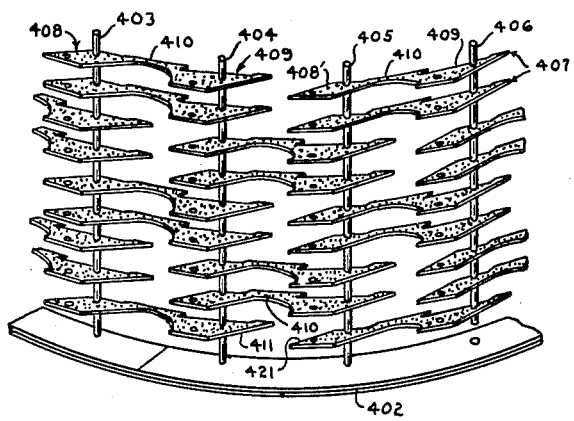

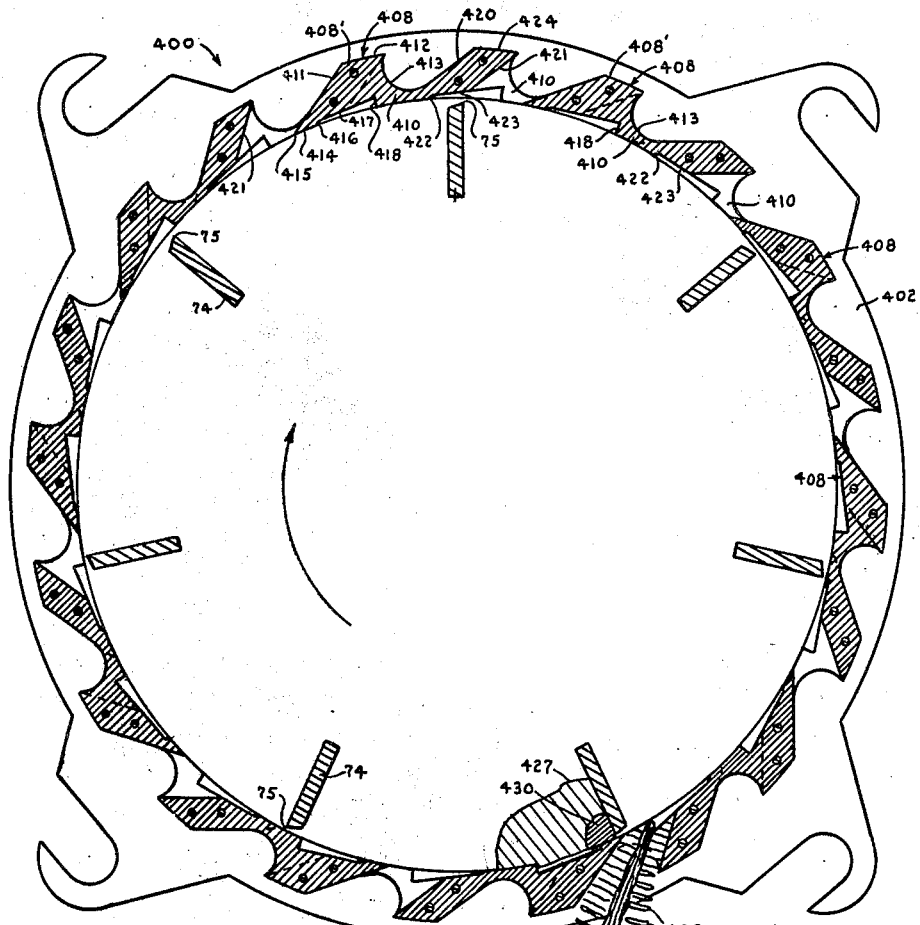
Fig.-38
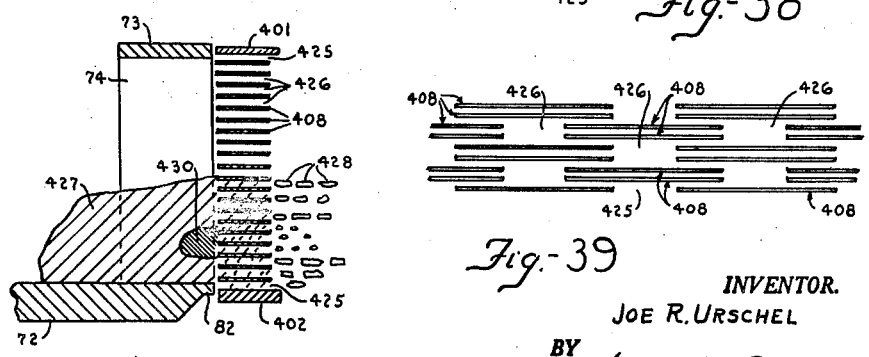
Fig.-37
Fig.-39
INVENTOR.
JOE R. URSCHEL
BY
Charles S. Penfold
ATTORNEY

INVENTOR.
JOE R. URSCHEL
BY
ATTORNEY

United States Patent Office 3,196,916
Patented July 27, 1965

3,196,916
COMMINUTING MACHINE
Joe R. Urschel, 202 Michigan Ave., Valparaiso, Ind.
Filed Aug. 4, 1961, Ser. No. 129,442
27 Claims. (Cl. 146—165)

The subject invention relates generally to means for conditioning a product and more particularly is directed to a mill or machine for slicing or cutting a product into slices or pieces.

One of the important objects of the invention is to provide a machine whereby a great variety of different products, such as meat, grains, cheese, vegetables, bone, fruits, chicken feet, dill, poppy seed, nuts, and cellulose material, can be efficiently sliced or conditioned.

A significant object of the invention is to provide a machine which primarily includes two units, preferably of relatively small sizes, which have a tremendous capacity for slicing or conditioning the product introduced or fed thereto. One of the units is preferably in the form of an annulus or cylindrical wall structure provided with opening and knife edges adjacent the openings and the other unit is preferably in the form of an impeller, rotatable at different rates of speed within the confines of the annulus for directing or centrifugally forcing the product received thereby against portions of the wall structure and/or knife edges to condition and cut the product into pieces and discharge the latter through the openings.

More particularly, an object of the invention is to provide a cylindrical wall structure or annulus comprised of a multitude of individual segments or elements which are preferably secured together in a superimposed or stacked relationship.

A specific but important object of the invention is to provide segments or elements, as above referred to, of different sizes and/or shapes which can be assembled and secured together in various combinations in a manner whereby to provide wall structures or units embodying modified characteristics so that, for example, one wall structure or unit may be utilized to cut one product, while other units embodying other features of construction may be selected to cut different products. Otherwise expressed, segments can be assembled in various ways to vary the size of the openings, the character of the cut and size and shape of the pieces to be sliced, severed or conditioned for discharge.

Another object of the invention is to provide an apparatus which requires a minimum amount of power for operation or driving the impeller.

A further object of the invention is to provide an apparatus in which the wall structure unit and impeller unit are operatively mounted and associated with another in a novel way and the motor or mechanism for producing the power is mounted and operatively connected with the impeller in a unique manner.

A specific object of the invention is to provide a machine including a pillar or post, a support for the above units and a support for the motor, and means common to both supports serves to detachably connect the same to the pillar in any desired rotative or elevated position.

Another object of the invention is to provide a novel hopper and mode of mounting the same in relation to the annulus and impeller.

Also, an object of the invention is to provide a unique method of assembling and/or method of bonding the segments to define a composite or unitary wall structure.

The invention further offers advantages with respect to manufacture, efficiency in operation and durability.

Additional objects of the invention will readily become apparent after the description hereinafter set forth is considered in conjunction with the various embodiments or modifications of the invention or inventions, exemplified in the drawings attached hereto.

In the drawings:

FIGURE 3 is an enlarged partial vertical section depicting the mode of preferably mounting one of the wall structure units or annulus and impeller and a part of a driving mechanism;

FIGURE 4 is an enlarged partial vertical section showing a hopper mounted in relation to an annulus and impeller;

FIGURE 5 is an enlarged top view of a part of a mounting structure for an annulus and impeller;

FIGURE 6 is a transverse section taken substantially on line 6—6 of FIGURE 5;

FIGURE 7 is a perspective view of an impeller which may be utilized in conjunction with an annulus;

FIGURE 8 is a relatively small top view of an annulus provided with attaching means which may be employed with respect to all of those illustrated herein;

Figure 31:
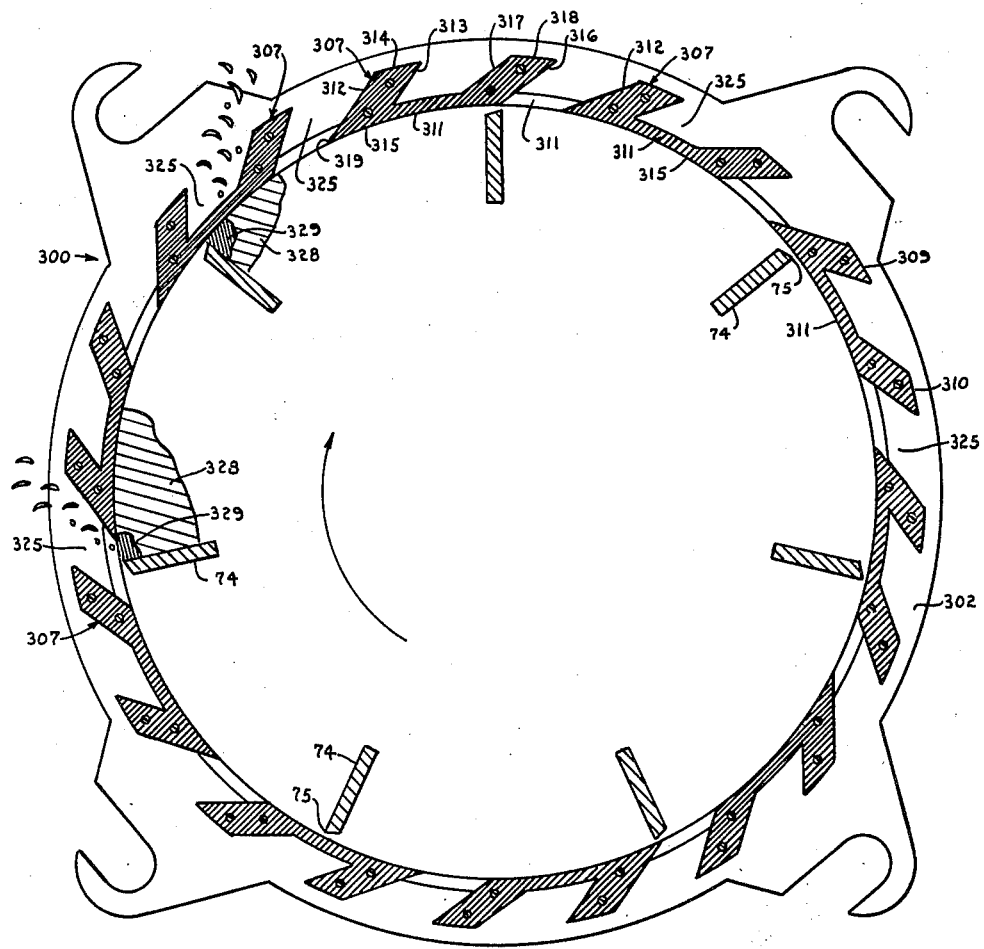
Figure 30:
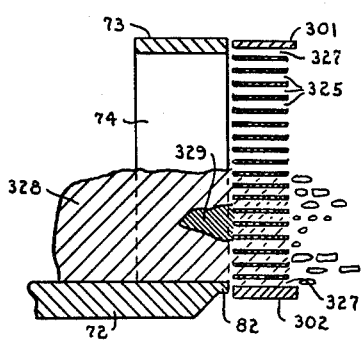
Figure 32:
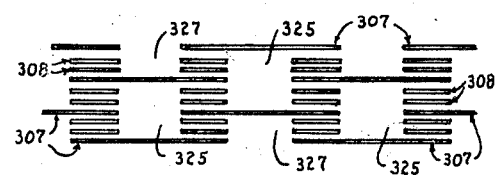
Figure 40:
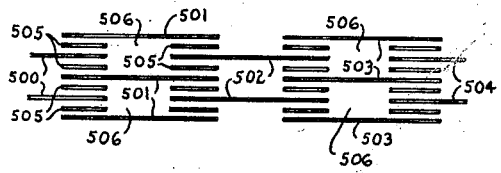

FIGURES 9 through 17 exemplify one embodiment of an annulus and FIGURE 9 depicts the annulus partially constructed in order to assist in illustrating the mode of assembling the segments and other components thereof;

FIGURE 10 is a partial exploded pictorial view showing with greater particularity the system of assembling the segments;

FIGURE 11 is an enlarged partial horizontal section of the annulus showing a mandrel whereby to facilitate assembling of the segments;

FIGURE 12 is a partial vertical section of the annulus depicting the manner of locking the segments in stacked relationship;

FIGURE 13 is an enlarged partial elevational view showing the character of certain cutting edges and openings adjacent thereto;

FIGURE 14 is a relatively small partial vertical section showing a product being discharged through openings in the annulus;

FIGURE 15 is an enlarged partial horizontal section disclosing the manner in which one kind of a product is being cut and projected through an opening in the annulus;

FIGURE 16 is a view similar to FIGURE 15 showing a different product being cut and projected through an opening in the annulus;

FIGURE 17 is a partial vertical diagrammatic view depicting the system of assembling the segments;

FIGURES 18 through 25 exemplify a second embodiment or modification of an annulus, and FIGURE 18 depicts such annulus partially constructed;

FIGURE 19 is a partial exploded pictorial view showing more in detail the system of assembling different segments;

FIGURE 20 is an enlarged partial horizontal section of the annulus showing the arrangement of certain segments;

FIGURE 20a is a plan view of slightly modified form of a long segment similar to the long segment shown in FIGURES 18 through 25;

FIGURE 21 is a view similar to FIGURE 20, showing an arrangement of different segments;

FIGURE 22 is an enlarged partial elevational view showing the character of the cutting edges of certain segments and an opening adjacent thereto;

FIGURE 23 is a relatively small partial vertical section showing a product being discharged through openings in the annulus;

FIGURE 24 is an enlarged horizontal section of the annulus showing a product being cut and projected through openings provided therefor in the wall of the annulus;

FIGURE 25 is a partial vertical diagrammatic view depicting the system of assemblying the segments;

FIGURES 26 through 32 exemplify a third embodiment or modification of the invention and FIGURE 26 depicts an annulus partially assembled;

FIGURE 27 is a partial exploded pictorial view showing particularly the system of assembling the segments utilized in such embodiment;

FIGURE 28 is a partial horizontal section of the annulus showing the manner of assembling the segments and the character of the openings defined thereby;

FIGURE 29 is an enlarged partial elevational view showing details of the cutting edges formed by the segments;

FIGURE 30 is a relatively small vertical section showing the openings and a product being cut and discharged through said openings;

FIGURE 31 is an enlarged horizontal section of the annulus illustrating more in detail the process of a product being cut and discharged;

FIGURE 32 is a partial vertical diagrammatic view depicting the system of assembling the segments;

FIGURES 33 through 39 exemplify a fourth embodiment or modification of the invention and FIGURE 33 shows the annulus partially assembled;

FIGURE 34 is a partial exploded pictorial view showing more in detail the mode of assembling the segments of this embodiment;

FIGURE 35 is a partial horizontal section showing additional details of the segmental arrangement and character of the openings defined by the segments;

FIGURE 36 is an enlarged partial vertical section showing details of the cutting edge or edges of the segments;

FIGURE 37 is a partial vertical section showing a product in the process of being cut into pieces and discharged;

FIGURE 38 is a horizontal section of the annulus depicting more in detail the character of the segments and openings and method of cutting a product;

FIGURE 39 is a partial vertical diagrammatic view depicting the system of assembling the segments; and FIGURES 40 through 47 respectively exemplify fifth, sixth, seventh, eighth, ninth, tenth, eleventh and twelfth embodiments or modifications of the invention showing additional different ways that segments may be assembled for cutting various products.

Figure 2:
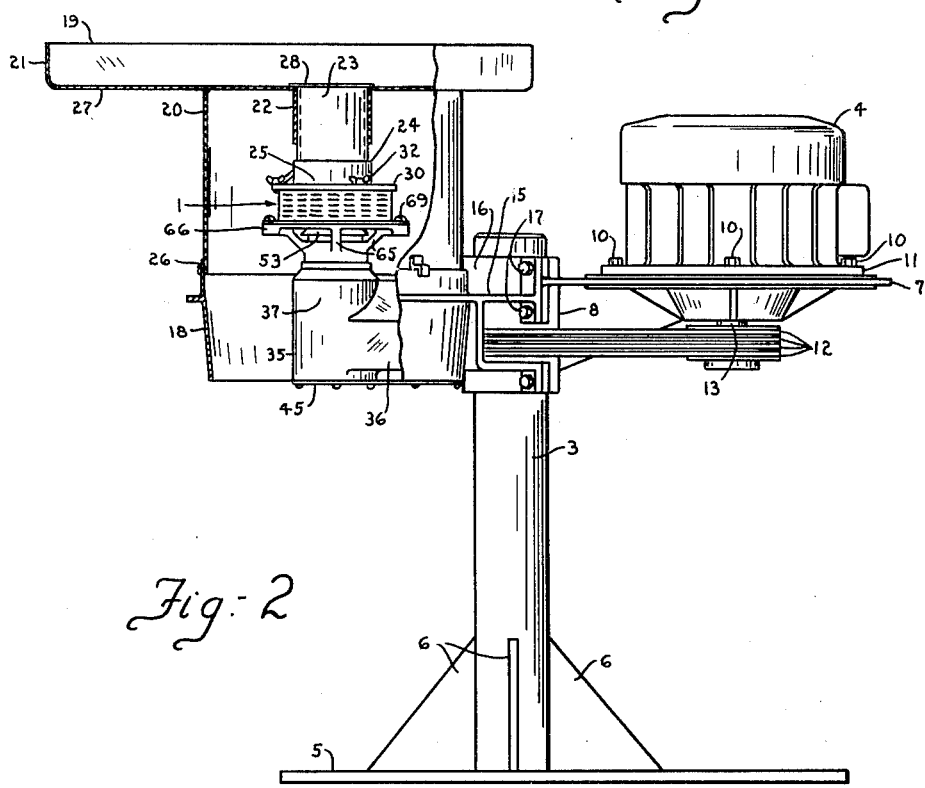
FIGURE 2 is an elevational side view of the apparatus, with portions in section to illustrate details of construction.

Referring now to FIGURES 2, 3 and 4 of the drawing, there is shown a cutting mill or assembly comprised of an annulus or unit generally designated 1 and an impeller generally designated 2 mounted for use with respect to a cylindrical pillar or post 3, with the impeller being operatively connected to a power unit preferably in the form of an electric motor 4.

More particularly, the pillar is preferably carried by a relatively large rectangular heavy base 5 and reenforced by braces 6. This base may be provided with apertures at its corners for anchoring the apparatus in place. The motor 4 is mounted on a horizontal platform 7 which has a flanged semi-cylindrical portion 8 for receiving the pillar and is provided with slots 9 through which bolts 10 extend from a base 11 of the motor whereby the motor may be adjusted horizontally relative to the platform for adjusting the tension on a plurality of V-belts 12 which operatively connect pulleys on a depending drive shaft 13 of the motor with a depending driven shaft 14 of a rotor structure which carries the impeller 2.

A horizontal support 15, best shown in FIGURES 1, 2, 5 and 6, is provided with a flanged semi-cylindrical portion 16 for receiving the pillar and bolts 17 extend through flanges of the portions 16 and 8 for adjustably clamping the platform 7 and support 15 to the pillar at any elevation or rotatable position desired.

Figure 1:
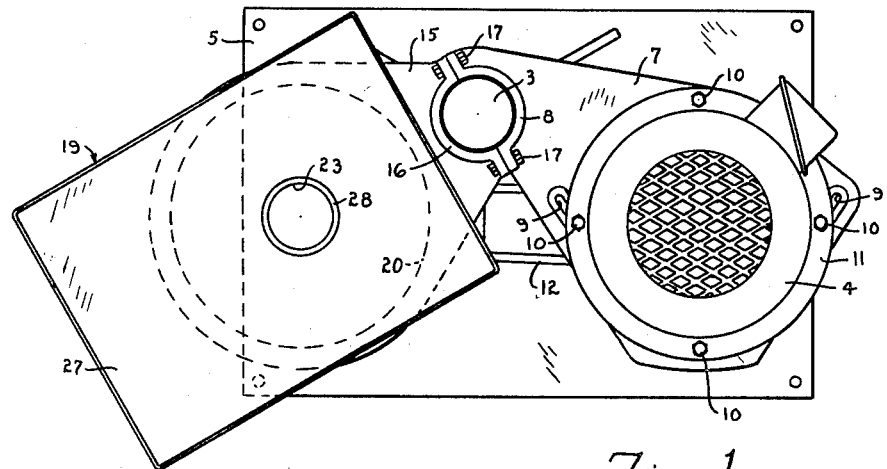
FIGURE 1 is a top view of the complete apparatus.

The support 15 includes a vertically positioned tapered cylindrical tubular portion 18 having an upper edge on which is mounted an assembly generally designated 19, illustrated in FIGURES 1, 2 and 4, and which preferably comprises a tubular guard or guide 20, a tray or hopper 21, a sleeve 22 and a tube 23. The ends of the tube are respectively telescopically received in the sleeve and in a tubular portion 24 of a tubular guide 25. The assembly 19 is preferably detachably mounted by providing the guard 20 with lugs 26 (see FIGURES 2 and 6) whereby the assembly can be readily mounted so that the lower end of the guard extends into the tubular portion 18 to constitute a vertical continuation thereof. The tray has a bottom wall 27 closing off the top of the guard 20 and this wall is provided with an opening which registers with the sleeve 22 carried by and depending from such wall. The tube 23 is provided with a flange 28 overlying the bottom wall 27. This tube assists in guiding the product to be cut into the annulus and may serve in centering and stabilizing the position of the assembly 19.

The guide 25 includes the tubular portion 24, alluded to above, which is counter-recessed at 29 to assist in piloting the tube 23 into position. The lower end of the tubular portion 24 is adapted for disposition in the impeller and provided with an opening diverging toward the impeller as shown in FIGURE 4. The guide is provided with an annular flange 30 which is adapted to be detachably held upon the annulus by screws 31 and wing nuts 32. The screws extend through holes provided therefor in the flange and the screws have hooked ends 33 which engage the underside of a top or upper attaching means generally designated 34 of the annulus 1 to detachably connect the guide thereto. It is to be understood that if desired the guide 25 and/or tube 23 may be mounted differently than shown.

The support 15, as depicted in FIGURES 2, 3, 5, and 6, also preferably includes a vertical tubular casing 35 disposed centrally of the tubular portion 18. This casing is provided with a radial tubular portion 36 through which the V-belts extend for protection against the cut pieces of the product and any juices therefrom which are directed or fall downwardly through the guard 20 and the tubular portion 18 of the support 15 into a receptacle or into a conveyor (not shown) therefor.

Any means suitable for the purpose may be employed to mount and rotate the impeller 2 and as depicted in FIGURE 3, such a means includes a cylindrical socket formation 37 constituting an integral part of the tubular casing 35. This formation has a bottom wall 38 upon which a vertical tubular bearing 39 is seated and detachably secured by screws 40 which extend upwardly through the bottom wall into the bearing for holding a shoulder 39' on the bearing against an upper rest portion 37' of the formation 37. The bottom wall is provided with an opening 41 through which the driven shaft 14 extends. This opening also provides clearance for a shield member 42 which is disposed therein and detachably secured to the bearing 39 by screws 43 extending upwardly through the member into the bearing. The shaft also projects through an aperture 44 provided in the member. The tubular casing 35 is preferably provided with a detachably cover plate 45 as shown in FIGURE 2, so as to afford access to the pulley on the shaft, the belts 12 and the screws 40 and 43.

The lower end of the tubular bearing 39 is recessed at 46 and receives a ball bearing assembly 47 and at its upper end has a longer recess 48 which receives a pair of corresponding ball bearing assemblies 49 and 50. The driven shaft is provided with axially spaced cylindrical portions 51 and 52 which are respectively journalled in the bearing assemblies 47, 49 and 50. The upper extremity of the shaft is provided with an annular head 53 and an enlargement 54 between the head and portion 52. The enlargement rests on the bearing assmbly 49 and the head supports the impeller 2 in a manner which will be described more in detail subsequently.

A sleeve 55 surrounds the driven shaft and its ends engage the bearing assemblies 47 and 50, including the cylindrical portions 51 and 52 of the shaft. A threaded element or nut 56 is engageable with a threaded portion 57 of the shaft for securing the bearing assemblies 47 and 50 against the ends of the sleeve 55 and the bearing assembly 49 between the enlargement 54 and the bearing assembly 50 against the bearing 39. An upper retaining member 58 primarily serves to hold the ball bearing assemblies 49 and 50 in the recess 48. The upper member 58 is provided with an aperture through which the enlargement 54 of the shaft extends and also with an upper annular groove 59. The members 42 and 58 and the element or nut 56 can be disconnected to permit removal of the rotor assembly. Screws, one identified as 58' in FIGURE 3, may be used to secure the member 58 to the socket formation 39.

The head 53 of the driven shaft is provided with an annular rib 60 which is rotatably received in the groove 59 and with a pair of concentric grooves 61 and 62 on opposite sides or the rib for receiving portions of the member 58 in order to assist in preventing portions of the product and/or juices therefrom from entering the internal bearing or rotor structure. The head is preferably of a diameter to appreciably overlap the member 58 and provided with a beveled peripheral edge 63 whereby to assist in deflecting portions and/or juices of the product generally radially outward through a plurality of circumferentially spaced openings 64 formed by four inclined arms 65 integral with the bearing 39. The arms 65 are joined to a horizontal annular support 66 which is recessed at 67 and provided with circumferentially spaced internally threaded ears 68, which extend radially from the arms. The base of the recess 67 and ears afford a firm seat for the annulus 1 and screws 69 may be used to detachably hold the annulus in place.

The head 53 of the driven shaft is further preferably provided with a central upstanding internally threaded boss 70, a larger boss 70' concentric to boss 70, and at least a pair of upstanding diametrically disposed pins 71 having their lower ends preferably fixedly inset in holes provided therefor.

The impeller 2 may be designed and constructed in various ways and utilized in conjunction with the annulus, generally designated 1, or with any of the other eleven annuluses or arrangements above referred to. The impeller, perhaps best illustrated in FIGURE 7, is preferably comprised of a lower annular base 72 and an upper ring 73 permanently secured in axial spaced parallel relation to the base by a plurality of circumferentially spaced vertical planar members or vanes 74, preferably seven in number, which extend both radially and longitudinally to provide relatively large openings which diverge outwardly. Otherwise expressed, the circumferential distances between the inner longitudinally extending edge portions of the members 74 are equal and less than the circumferential distances between their outer longitudinally extending portions which are beveled to provide sharp cutting edges 75. The cutting edges are preferably disposed in alignment with the peripheral edges of the base and ring. The base is preferably provided with a central hole 76 and a pair of smaller holes 77 which are adapted to respectively receive the boss 70 and pins 71 to assist in locating and drivingly connect the impeller to the head 53 of the shaft. A nut and screw assembly 78 and a washer 79 serve to fasten the impeller in place. The large boss 70' on the head assists in accurately positioning the impeller thereon. It will be noted that an inner portion of the support 66 is preferably bevelled at 80 and that the periphery of the base 72 is also preferably beveled at 81 and provided with a horizontal flange 82 which are adapted to respectively overlie the bevel 80 and the upper surface of the support in relatively close relation thereto whereby to assist in preventing the flow of any cut material or product and/or juices therebetween.

In view of the foregoing, it should be manifest that the product to be cut or conditioned is adapted for placement on the tray where it may be manually fed therefrom into and through the tube 23, guide 25, and into the impeller through an opening defined by the ring 73. It will also be apparent that the means above described for supporting and driving the impeller offers advantages with respect to efficiency, stability, durability, adjustment and maintenance. The impeller may be rotated by the motor 4 at any speed desired, but it is preferably rotated within a range between 1,800 r.p.m. and 12,000 r.p.m. The speed selected, among other things, is subject to the character or kind of product to be cut and the size and structural characteristics of the annulus selected to perform the cutting.

Referring now with respect to the structure of the annulus 1, illustrated in FIGURES 8 through 17, which is one of the many embodiments or modifications exemplified in the subject application and to which the invention is susceptible, the annulus includes, among other things, the upper attaching means 34, above referred to; a lower attaching means or base generally designated 83; a multitude of segments generally designated 84 and 85 interposed between the upper and lower attaching means; and a plurality of preferably twenty circumferentially spaced longitudinally extending rods, rivets, or elements, including the rods 86, 87, 88 and 89, shown in FIGURE 10, extending through both attaching means and all of the segments whereby to assist in assembling and connecting the components preparatory to further steps in the process or method of completing its manufacture, all of which will be described more in detail subsequently.

The upper attaching means or ring 34 is preferably comprised of a bottom layer of four corresponding arcuate parts 90 arranged in an end-to-end relationship and a top layer of four corresponding parts 91 which are similarly arranged and in overlapping arrangement with the parts of the bottom layer so that the abutting ends of the top layer are respectively located substantially midway the lengths of the parts of the bottom layer in order that the points of abutment between the parts of the respective layers are oriented to promote strength. The parts 90 and 91 are preferably provided with twenty circumferentially spaced aligned apertures 92.

The lower attaching means or base 93 of the annulus is preferably comprised of a plurality of four corresponding arcuate parts 93 arranged to form a bottom ring or layer and a plurality of four corresponding arcuate parts 94 forming an upper ring or layer superimposed on the bottom ring in a manner similar to that of the parts 90 and 91. The parts 93 and 94 are preferably provided with a plurality of twenty circumferentially spaced aligned apertures 95 which are axially alignable with the holes 92 in the upper attaching means 34 through which the rods extend. Each of the parts 93 and 94 is also preferably provided with a generally triangular ear 96 having a notch or opening 97 at one side thereof, which ears and openings are so disposed that the annulus can be readily mounted on the support 66 and turned so that the openings will accommodate the screws 69, after which the latter can be tightened to firmly detachably anchor the annulus in operative position.

Although the attaching means 34 and 83 are each depicted as being comprised of a pair of layers it is to be understood, that if so desired, each attaching means may be constructed in one-piece or made up of more than a pair of layers with any number of parts in each layer. It is to be further understood that if each of the attaching means is comprised of two or more layers or laminations they may be permanently secured together prior to or after assembly with the segments 84 and 85 and connecting rods.

As exemplified in FIGURES 9 through 12, each of the segments 84, which may constitute a knife or spacer or both, is provided with a pair of spaced apertures 101 and 102 through which a pair of rods extend and a pair of holes 103 and 104 through which sticks, slugs, or pieces 105 and 106 of brazing material extend, and each of the segments 85 is provided with an aperture 107 through which a rod extends and a hole 108 through which a stick of brazing material extends. Each of the rods is provided with a head or enlargement 109. The rods are preferably inserted upwardly through the aligned apertures 95 in the parts of the lower attaching means 83 until the heads 109 engage the parts of the lower layer of such means, after which this partial assembly may be placed upon a planar table top or mounting and about a mandrel or cylindrical form 110 as shown in FIGURE 11, whereupon the segments are connected to the rods in accord with a particular arrangement or pattern previously determined. When all of the segments are in place, the sticks of brazing material are threaded downwardly through the aligned holes in the segments, after which the individual parts 90 and 91 of the layers of the upper attaching means 34 are successively connected to the rods, whereupon a predetermined amount of axial pressure is applied to one or both of the attaching means 34 and 83 to firmly hold the segments together, while the upper ends of the rods are upset as indicated at 111 to permanently hold the segments and parts of the attaching means in a pressed condition. The rods serve to initially hold the segments more or less in a predetermined loose relationship, whereas the mandrel 110 not only assists in guiding the segments onto the rods but primarily serves to accurately locate the segments, which is desirable from the standpoint of obtaining an efficient cutting action.

Due to the fact that several rods extend through the parts of both of the attaching means 34 and 83, with a pair of rods through each of the segments 84, and with a rod through each of the segments 85, these components are held in a unique interlocking relationship.

After the components of the annulus are permanently secured together with the parts and segments in a tightly pressed stacked condition the annulus is placed in a furnace operating at a relatively high temperature for a predetermined period. Provision is made to reduce the atmosphere in the furnace to prevent oxidation. The components are preferably hardened and brazed simultaneously, followed by additional steps in heat treating to establish or impart a proper hardness and toughness to the annulus or assembly.

After the annulus is thus treated, the heads of the rods are removed and then the ends of the attaching means 34 and 83 are ground flat on a grinding machine. When the ends of the attaching means are so ground to provide a pair of substantially true parallel surfaces, the inside of the annulus is then ground to a predetermined accurate diameter or dimension in order to establish a proper clearance between the inside peripheral surfaces of the annulus and the vertical cutting edges 75 of the impeller. A clearance of .003 between the edges 75 of the impeller and the cutting edges on the annulus has proven desirable for some products but this may be varied as desired.

The final operation in the manufacture of the annulus is to grind the outer peripheral surface of the top or upper attaching means 34, the purpose of which is to establish or provide a substantially true cylindrical surface which is adapted to concentrically and telescopically receive a lower peripheral edge of the tubular guide 25.

The method above described is but one of several that may be employed. For example, it may be desirable to drop the various components such as the segments and parts of the attaching means 34 and 83 into a fixture and then direct the connecting rods through the components as the last step prior to riveting or upsetting the rod ends.

In the manufacture of the annulus the segments or knives 84 are referred to as full notched segments. These segments are somewhat larger or longer than the segments 85. As clearly illustrated particularly in FIGURES 9, 10, 11, 15 and 16, each of the segments is preferably arcuate, planar and elongate, and defined by an outer circumferential edge 112, a leading straight end edge 113, a trailing straight end edge 114, and an inner structure which is preferably interrupted by a pair of notches to define a relatively short inner arcuate edge 115 and a longer arcuate edge 116. One of the notches is defined by a short straight edge 117, a long straight edge 118, and a short straight edge 119 and the other notch is defined by a short straight edge 120, and a long straight edge 121. It is to be noted, among other things, that the straight edges 113, 114, 117, 118, 120 and 121 are all disposed chordally with reference to the center point of the annulus; that the leading edge 113 is longer than the trailing edge 114; that the chordal length of the short edges 117 and 120 are substantially identical; that the edge 119 is substantially radially disposed and at an oblique angle with reference to edge 118 and in combination with the arcuate edge 116 defines a knife point 119'; and that the inner arcuate edges 115 and 116 have the same radius. Attention is also directed to the fact that the straight leading edge 113 and the short inner arcuate edge 115 intersect to define a sharp cutting knife edge or arris 122 and that the edge portions 118, 119 and 116 may also be considered to constitute cutting edges.

In the manufacture of the annulus, the smaller or shorter segments 85 are referred to as spacers or as a notched shearing type. As shown, each of the segments is preferably planar and elongate and defined by a pair of parallel edges 123 and 124, an outer arcuate end edge 125, an inner structure having an arcuate inner edge 126, and a notch which defines a short straight edge 127 and a long straight edge 128. It is to be noted that when these segments are properly assembled with the rods that their straight edges 123, 124, 127 and 128 are all chordally arranged; that the straight edge 123 is longer than the straight edge 124 and that these edges respectively correspond in length to the length of the leading and trailing edges 113 and 114 of each of the segments 84 and register or coincide therewith; that the edges 125, 126, 127 and 128 of certain of the segments 85 respectively register with the edges 112, 115, 117 and 118 of the segments 84; and that the edges 125, 126, 127 and 128 of other of the segments 85 substantially respectively register with the edges 112, 116, 120 and 121 of the segments 84. The edges 123 and 126 of each of the segments 85 intersect to define a knife edge or arris 126' which is adapted to register with the knife edge 122 of each of the long segments.

It should be noted that the hole 108 provided in each of the segments 85 is located adjacent its outer arcuate edge 125 and that the holes 103 and 104 in each of the segments 84 are arranged adjacent its outer arcuate edge 112. In other words, the holes provided in the segments 84 and 85 are all radially disposed the same distance from the center of the annulus and all of the apertures are disposed a shorter radial distance from such center.

One mode of assemblying the components, as clearly depicted in FIGURES 9, 10, 15 and 17, will now be described. A pair of the long segments 84 are selectively or jointly fitted onto a pair of adjacent rods, such as 86 and 87, in a superimposed relation on the base or lower attaching means 83 of the annulus, a pair of segments onto an adjacent pair of rods 88 and 89 and so on around until ten pairs of segments constituting two layers have been laid so that the segments in each layer are circumferentially spaced apart, with the end edges 113 of one pair of segments and the end edges 114 of an adjacent pair of segments defining a part of one of twenty chordally disposed openings 129, through which the cut product is discharged from the annulus. The openings diverge outwardly and generally tangential in the direction that the size or cut product is adapted to flow. The manner of constructing these openings will be described more in detail subsequently.

After the two layers of long segments have been laid a short segment 85 is fitted onto each of the rods for disposition upon each extremity of each uppermost long segment to provide a layer of short segments. Thereafter, for example, a pair of the long segments is connected to the pair of rods 97 and 88 for disposition on a pair of short segments previously respectively connected to these rods, with additional pairs of long segments being similarly connected to adjacent pairs of rods until ten segments in each layer have been laid, whereupon short segments of another layer are respectively connected to the rods with a pair of these segments bearing upon each of the long segments of the uppermost layer. With this system of assembly it will be manifest that the long segments 84 are circumferentially spaced in layers; that the short segments are circumferentially spaced in layers; that the segments 84 and 85 are stacked in a superimposed relationship, with the long segments axially spacing the short segments from one another, and the short segments axially spacing the pairs of long segments.

As further evidenced in FIGURE 17, the annulus is comprised of long segments stacked in double layers or tiers and stacked single layers or tiers of short segments, all of which are arranged substantially in alternate and/or staggered positions of relationship. More specifically, for example, the bottom long segment of an upper pair thereof and the upper long segment of a lower pair of these segments in combination with the circumferentially spaced opposed edges 113 and 114 of an intermediate pair of long segments and the circumferentially spaced opposed edges 124 and 123 of an adjacent pair of short segments arranged between the pairs of long segments define each of the chordally disposed divergent discharge openings 129. The openings substantially correspond in size and shape and they are both axially and circumferentially spaced, with preferably twenty openings in one annular row alternately arranged with respect to twenty openings in an adjacent annular row and a predetermined number of axially spaced openings in each vertical row. The diameter and axial length of the annulus may be varied as desired, as well as the size, shape and number of the openings therein. However, in practice, the annulus is preferably constructed with an inside diameter of approximately six inches and in various lengths from one to three inches. Also, it should be noted that parts of the upper and lower attaching means may assist in defining the upper and lower horizontal rows of openings, as distinguished from those openings which are defined solely by the segments.

Attention is directed to the fact that when the manufacture of the annulus has been completed, the segments and parts of the attaching means are one solid unit so that, for example, the openings shown in FIGURES 9 and 17 are axially or vertically spaced by a pair of long segments which appear as one integral portion 130 of the structure when further viewed in FIGURE 13. Attention is further directed to the fact that the segments, after grinding, provide substantially vertical rows of a multitude of staggered cutting edges and that the integral portions 130 provide horizontal cutting edges, all of which edges serve to produce an efficient cutting of the product and at the same time promote durability for the useful life of the annulus. It will also be apparent that the edges 126 of the short segments will register with the edges 115 and 116 of the long segments to define circumferentially spaced vertically disposed continuous arcuate areas 131. The integral portions 130 are also ground to provide horizontal arcuate cutting edges having the same radius as the areas 131. It will also be apparent that the edges 117 and 118 of one vertical row of the segments 84 respectively register with the edges 127 and 128 of the segments 85 and that the edges 120 and 121 of an adjacent vertical row of segments 84 respectively register with the edges 127 and 128 of the segments 85 to provide substantially continuous vertical outwardly extending divergent relief areas or pockets 132 which are angularly disposed at an appropriate rake angle with reference to the inner arcuate areas to facilitate cutting. The product is driven with considerable force against the radial edges 119 disposed substantially midway of the inner ends of the discharge openings or passages 129 to condition or otherwise modify its cell structure or cut the same, depending on the character or kind of product, so that it is in better shape for shearing or cutting by the vertical knife edges 122 and 126'.

With reference to FIGURES 15 and 16 of the drawing, it will be noted that the opposed edges of a pair of long segments and short segments register with another and if extended inwardly converge and substantially intersect a radial line X at a point Y, which point will substantially coincide with a center point Z on the forward planar face of each of the vanes of the impeller when such force is substantially perpendicular to the plane of such radial line. With this unique arrangement the product is thrown against the surfaces defining the relief areas or pockets for conditioning immediately in advance of cutting or conditioning by the vertical rows of radial edges located substantially midway of the entrance ends of the discharge openings and prior to subsequent cutting by vertical rows 133 formed by the cutting points or edges 122 and 126'.

As depicted in FIGURE 15, a granular product such as grains of rice or coffee beans 134 is shown as being cut and discharged, as distinguished from cutting a product such as meat 135, as depicted in FIGURES 14 and 16. The particular annulus shown in these figures is also suitable for cutting such products as bone and wood. The organization is such that the product moves from the annulus on a tangent until it strikes the cutting edges 119 where the product is sliced in a horizontal manner. This does not separate the particle or piece being cut from the main mass inside the annulus. The product continues to move until it passes against the cutting edges 122 and 126' where the piece is completely severed from the main mass of the product. It will be noted that the edges 119 are disposed back of the cutting edges 122 so as to facilitate discharge of a product such as meat. However, the edges 119 will cause meat fibers to hang thereon to some extent and tend to plug the openings through which the meat is extruded. This, and the fact that the openings are quite long, causes the fat to blend or mix with the lean but tends to increase the temperature of the meat due to forcing it through the narrow openings. The long segments are also particularly suitable for cutting hard product as alluded to above as it has great strength as compared to some of the other styles hereinafter referred to.

Referring now to the second embodiment of the invention exemplified in FIGURES 18 through 25, there is shown an annulus generally designated 200 comprised of a pair of upper and lower attaching means 201 and 202, which respectively correspond to the attaching means 34 and 83 of the first embodiment, and corresponding long segments generally designated 203 and short segments 204 which are connected preferably to twenty connecting rods or elements including those designated 205, 206, 207 and 208. Otherwise expressed, the annulus 200, except for the character of the long segments 203 and their operative relationship with one another and the short segments, substantially corresponds to the structure of the annulus generally designated 1.

Each of the long segments in manufacturing is referred to as a full angular shearing segment, and, as clearly shown in FIGURE 20, includes a pair of similar extremities 209 and 210 which are joined by an intermediate restricted connecting traverse portion 211. Each of these extremities is provided with an aperture 212 and a hole 213 for respectively receiving a connecting rod and a stick or slug of brazing material. The extremity 209 is defined by a long straight edge 214, a short straight edge 215 parallel to edge 214, an outer arcuate edge 216, and inner structure having a short arcuate edge 217 and a notch defined by a short straight edge 218 and a long straight edge 219, which is disposed at an oblique angle with reference to the parallel edges 214 and 215 and the connecting portion 211 and intersects the latter at a location intermediate its length. The other extremity 210 of each of the long segments is defined by a long straight edge 220, a short straight edge 221, an outer arcuate edge 222 and inner structure having an inner arcuate edge 223, and a notch defined by a short straight edge 224 and a long straight edge 225. The inner arcuate edge 223 merges with the connecting portion 211 and the inner straight edge 224. The straight edge 214 and inner arcuate edge 217 of the extremity 209 intersect to define a sharp point or edge 226 and the inner edge of the connecting portion 211 and the inner arcuate edge 223 of the other extremity 210 intersect to define a sharp cutting point or edge 227, the latter of which is substantially in line with the straight edge 220.

Each of the short segments 204 substantially corresponds to each of the segments 85, above referred to, and is defined by a long straight edge 228, a short straight edge 229 parallel to edge 228, an outer arcuate edge 230 and inner structure having an inner acurate edge 231, and a notch defined by a short straight edge 232 and a long straight edge 233. The edges 228 and 231 intersect to define a sharp cutter point or edge 234.

As depicted in FIGURE 20, the segments are adapted for connection with the connecting rods (and about a mandrel not shown) to facilitate such connection. More particularly, as illustrated in this figure and FIGURES 18, 19, 22 and 25, a pair of short segments 204 are connected, for example, to each of the rods 205, 206 and 207 and 208 in a superimposed circumferentially spaced relationship, after which, for example a long segment 203 is connected to the adjacent pair of rods 207 and 208 for disposition on an upper pair or layer of short segments, with additional long segments being similarly connected to adjacent pairs of rods to form a layer or tier of long segments which are circumferentially spaced. Thereafter, short segments are connected to each of the rods and respectively upon the extremities of each long segment and so on until a predetermined height of segments is attained, after which the parts of the attaching means and segments are clamped and locked together by upsetting the ends of the rods as steps in the method of assembly, preparatory to the final operations of brazing, tempering and grinding as alluded to above with respect to one method of manufacturing the annulus 1.

When the parts of the attaching means and all of the segments are properly joined, it will be apparent that the edges 230, 228, 234, 231, 232, 233, and 229 of certain shorter segments will respectively register with the edges 216, 214, 226, 217, 218, 219 and 215 of each of the extremities 209 of the long segments and that the edges 230, 228, 234, 231, 232, 233, and 229 of certain other short segments will respectively register with the edges 222, 220, 223, 224, 225, and 221 to define, among other thigs, vertical rows of cutting edges formed by the points or edges 226 and 234 and vertical rows of cutting edges or points formed by the edges or points 234 and 227 which rows are circumferentially spaced apart.

It will be evident, by referring to FIGURES 18, 19, 23 and 24, that the edges 228 and 229 of two opposed pairs of short segments on the rods 207 and 208 and a connecting portion 211 of a long segment define in combination with the lower attaching means a discharge opening 235 and that the edges 228 and 229 of the opposed three pairs of sharp segments stacked upon a lower long segment, including the connecting portion 211 of the latter, the opposed edges 221 and 214 of a pair of long segments, the edges 228 and 229 of opposed three pairs of short segments stacked on the pair of long segments and the connecting portion 211 of a top long segment, in combination with one other, define a large discharge opening 236 above the opening 235. This system of stacking also provides a vertical row of axially spaced openings like the opening 236 and depending on the height of the annulus desired, the upper attaching means 201 may assist in providing openings like the opening 235.

Also, it will be evident, that the edges 228 and 229 of two opposed pairs of short segments, the opposed edges 221 and 214 of an adjacent pair of long segments, the edges 228 and 229 of opposed three pairs of short segments stacked on the long segment, including the connecting portion 211 of an upper long segment and the lower attaching means will provide an opening 237, the side of this opening and all openings being more or less dependent on their number and locations and relationship to the upper and lower attaching means. In other words, except possibly for openings of a smaller size at the top and bottom of each vertical row, the wall structure of the annulus is provided with discharge openings of substantially corresponding size, which openings are spaced circumferentially, vertically and alternately.

Attention is directed to the fact that the edges 232 and 233 of certain of the short segments register with one another and with the edges 218 and 219 of the long segments of the extremity 209 and that these same edges of other short segments register with one another and with the edges 224 and 225 of the extremity 210 to define vertically disposed substantially continuous relief areas or pockets 238. These areas actually constitute rake angles so as to insure that the product will be efficiently sliced or cut by the vertical horizontally spaced rows of sharp pointed edges 226, 227 and 234 and by the horizontal connecting portions 211 of the long segments which constitute radial or horizontal cutting edges. Due to the character of the relief areas and their relationship to the openings, the cut product will be projected freely from the annulus where it may fall downwardly or engage the guide 20 for direction into a receptacle or onto a conveyor not shown. Attention is further directed to the fact that the long segments which have connecting portions defining the ends of the openings or extending thereacross also serve to impart strength to the annulus and that the acrucate edges of the segments in each row actually appear as being substantially continuous or integral when ground as evidenced at 239 in FIGURE 22.

The annulus 200 constituting the second embodiment may be utilized to cut any product desired but has been constructed to preferably cut chunks of meat 241 into relatively coarse pieces or parts as shown in FIGURES 23 and 24. The size of the openings determine the size of the pieces cut and discharged.

More particularly, the long segments may or may not act as knives depending upon the character of the product or the speed of operation. The product to be cut enters the hole in the top of the impeller and is brought up to rotating speed by the impeller blades. The ends of these blades run very close to but do not touch the inside surface of the annulus or cutting head. A combination of centrifugal force and impact forces the product against the long segments and because of this force, some of the product will bulge out between these segments. Whatever amount of product bulges between these segments will be sliced off by the vertical knives. These segments will act as knives on soft products which will simply be thrown through the segments.

Depending upon the character of the product, the kind of cutting head used and the speed of the impeller, the shape of the cut pieces may be shreds, flakes or chunks.

With the proper cutting parts, the proper speeds and the proper controlled capacity, it is not possible to plug the annulus or mill with product containing strong fiber, heavy sugars or fat and oils. On soft and resilient types of product, size of pieces in the reduction can be closely controlled. On hard and brittle types of product, there will be some shattering of product with the result of less control over size of pieces in the reduction. Because the mill is free cutting, many products can be reduced to a fine state with little temperature rise.

With various meats the annulus creates products with several unique properties. Meat can be cut into small flakes which are not only tender but which interlock to form patties or meat balls that hang together remarkably well. Because this mill will freely cut any tissue found in meat, low quality material can often be upgraded to high quality in both flavor and texture. Because the annulus can freely cut meat without crushing, certain soft meats can be cut and put back together to make products that cannot be made with any other existing equipment. With the proper cutting parts and proper speeds, meats can also be reduced to a fine paste. Bone can also be reduced to a paste with the unit. Hard frozen meat can be reduced with the mill but most of the advantages of the mill will be lost because the meat will be shattered into pieces of many sizes and shapes rather than being cut into flakes.

As exemplified in FIGURE 20a there is shown a long segment 200a which is substantially the same as the long segments 203 employed in the annulus of FIGURES 18 through 25 except that the segment 200a is filled in between its extremities. In other words, its inner cutting edges and relief areas correspond to those of segment 203 and it has a continuous outer arcuate edge as distinguished from being notched or interrupted. The segments 200a have proven advantageous with respect to strength and durability but do offer greater resistance to the flow of the product through the discharge openings as compared to the annulus 200.

In FIGURE 21 there is disclosed a portion of a slightly modified form of an annulus comprised of long segments 203' and short segments 204' which are quite similar to the segments illustrated in conjunction with the second embodiment of the invention. The segments 203' are adapted for association with the short segments 204' and the other components in a manner substantially corresponding to that of the second embodiment. It is believed that the utility of this modification will be sufficient by merely defining the structure of the segments and the relationship of the marginal edges defining their shape.

Each of the long segments includes a pair of extremities 209' and 210' joined together by an intermediate restricted connecting portion 211'. The extremity 209' is defined by edges 214', 215', 216', 226', 217', 218' and 219' and the extremity 210' by edges 220', 221', 222', 223', 224' and 225'. The principal difference between the long segment 203' and 203 resides in joining the connecting portion 211' with the edge 220' at a location intermediate its length to leave an edge 242 and thereby define a sharp point or cutting edge 243. The arrangement is such that edges 228', 234', 271' and 233' of certain of the short segments register with the edges 214', 226', 217', 218' and 219' of the extremity 209' of the long segments and that the aforementioned edges of other short segments will respectively register with the edges 243, 223', 224' and 225' of the extremity 210' of the long segments to define discharge openings 244 and arcuate areas similar to those referred to above in connection with the second embodiment of the invention. Moreover, it will be noted that connection portion 211' is disposed outwardly more in a tangential relation to the inner periphery of the annulus than the connection portion 211 so that the product is sheared by the portion 211' at a location intermediate the opposed edges 221' and 214' of adjacent pairs of long segments and the opposed edges 215' and 220' of the extremities 209' and 210'.

The connecting portions 211' as well as the portions 211 actually divide elongate vertical openings into smaller discharge openings. Otherwise expressed, these horizontal connecting portions serve to slice a vertical mass into pieces. It is to be noted that the edges 219' of the connecting portions 211' as well as the edges 219 of the segments 203 assist in gradually slicing the product.

The third embodiment of an annulus generally designated 300 exemplified in FIGURES 26 through 32 will now be described. This annulus preferably includes an upper attaching means 301, a lower attaching means 302, a plurality of twenty connecting rods, including the rods 303, 304, 305 and 306, a plurality of long segments generally designated 307 and a plurality of short segments generally designated 308, which are connected to the rods in a predetermined stacked or superimposed relationship. The long segments 307 in the manufacture of the annulus are referred to as being segments of a relieved smooth type and the short segments as spacers of a smooth type. These segments, like all of the segments alluded to above and hereinafter referred to, are preferably provided with suitable apertures and holes for the connecting rods and slugs of brazing material.

Each of the long segments is preferably comprised of a pair of extremities 309 and 310 joined by an intermediate restricted connecting portion 311 disposed transverse to these extremities, as in the case of the connecting portions 211 and 211' above referred to. The extremity 309 of each long segment is defined by a long straight end edge 312, a short straight edge 313 parallel to edge 312, an arcuate outer edge 314 and an inner arcuate edge 315 which extends continuously to define what may be termed an arcuate edge of the connecting portion and the adjoining extremity 310. In other words, the connecting portion and the extremity 310 has an inner arcuate edge. The extremity 310 is defined by the aforesaid inner arcuate edge, a long straight end edge 316, a short edge 317 parallel to edge 316 and disposed at an angle with relation to the short edge 313 of the extremity 309 and an outer arcuate edge 318. The opposed edges 313 and 317 of the extremities assist in defining a part of a discharge opening and the opposed edges 316 and 312 of a pair of adjacent segments assist in defining another discharge opening. The edges 312 and 315 of the extremity intersect to define a sharp cutting point or edge 319.

Each of the short segments is defined by a pair of parallel edges 320 and 321, an inner arcuate edge 322 which intersects the edge 320 to form a sharp point or edge 323, and an outer arcuate edge 324.

As clearly shown, particularly in FIGURES 26, 27, 30, 31 and 32, the segments may be connected to the rods by first attaching a long segment to the rods 303 and 304, a long segment to the rods 305 and 306 and so on onto adjacent pairs of rods until a single layer of these segments are laid in a circumferential spaced relationship. A pair of short segments are then stacked onto each of the rods 303 and 304 upon a long segment, a pair of short segments to the rods 305 and 306 and so on around until two layers of short segments are laid in a circumferential spaced relationship. A ring or layer of long segments are then connected with one on the rods 304 and 305, and others to the remaining pairs of rods, followed by successive layers of short and long segments.

When all of the segments are properly assembled to obtain a predetermined height, it will be apparent that edges 320, 323, 322, 321 and 324 of certain short segments will respectively register with the edges 312, 319, 315, 313 and 314 of the extremity 309 of a long segment and that the aforementioned edges of other short segments will respectively register with the edges 317, 315, 316 and 318 of the other extremity 310 of the long segments. The edges 320 of the short segments which register with the edges 312 of the long segments define one side of a discharge opening 325 and the edges 321 of other short segments registering with the edges 316 of a long segment define an opposite side of this opening. The edges 321 registering with the edges 313 of the long segments define one side of another opening while the edges 320 registering with the edges 317 define an opposite side of an opening, which openings are substantially identical in shape and size when viewed in FIGURES 31 and 32. The openings are divergent and chordally arranged and after the annulus has been ground internally, the edges 319 and 315, for example, of the long segments and the edges 323 and 322 of certain short segments appear as a vertical or longitudinal continuous arcuate area or surface 326, with serrated or staggered edges and that the arcuate edges of other short segments in combination with other portions of the arcuate edges 315 provide similar longitudinal areas as evidenced in FIGURES 26 and 29. The connecting portions 311 also appear as being integral with the segments, which portions along with others actually divide an elongate continuous vertical opening into smaller discharge openings. These connecting portions also constitute horizontal cutting edges.

The segments are preferably assembled, as evidenced in FIGURE 32, by utilizing a bottom long segment, two pairs of short segments, the opposed ends of a pair of adjacent long segments, two pairs of short segments and an upper long segment to define the discharge opening 325. By similarly stacking additional segments, additional corresponding vertical openings will be provided. It will also be apparent that if the lower ring of long segments are mounted on the lower attachine means 302, the opposed edges of an adjacent pair of long segments, the edges of two pairs of short segments respectively laid on these long segments, and an upper long segment in combination with such attaching means will define a smaller opening 327. Openings similar to 327 would be provided if the top ring of long segments engaged the upper attachine means. The openings 325 and 327 are disposed vertically, horizontally and alternately.

The annulus 300 may be utilized to slice any product permitted by its construction but it is preferably adapted to cut veal indicated at 328 in FIGURES 30 and 31 into fine slices or pieces and any bone or gristle 329 embedded therein. It is to be noted that the long segments 307 may or may not cut through the product, depending upon how soft the product is and how much centrifugal force is exerted against its edge 311. When cutting a soft product as veal with relatively hard cartilage in it, the veal is cut by the edges 311 and flows from the annulus in relatively large pieces. The cartilage is not cut by these edges but centrifugal force causes sufficient distortion of the cartilage so that the cutting edges 319 are able to make fine shavings from it. This result is considered unique and a real advance in cutting. Bulging out of the veal and slicing by vertical edges is also inherent in this particular annulus.

An annulus generally designated 400 and illustrated in FIGURES 33 through 39 will now be described. This annulus includes an upper and lower attaching means 401 and 402, connecting rods, including rods 403, 404, 405 and 406, and long segments generally designated 408. These long segments in the manufacture of the annulus are referred to as a segment of the relieved notch type. Each of the segments is preferably comprised of a pair of extremities 408' and 409 joined by an intermediate restricted connecting portion 410. The extremity 408' is defined by a long straight edge 411, an outer arcuate edge 412, a portion of an arcuate edge 413, an inner arcuate edge 414 intersecting the edge 411 to define a sharp point or edge 415, and an inner notched structure defined by an edge 416 and an edge 417 which intersect a radial edge 418 of the connecting portion 410. The portion 410 has an inner arcuate edge 419. The other extremity 409 of each segment is defined by a straight edge 420 which merges with the arcuate edge 413, a straight edge 421, an inner edge 422, a straight edge 423 and an outer arcuate edge 424.

As depicted in FIGURES 33, 34 and 39, a segment is connected to a pair of adjacent rods 403 and 404, a segment to rods 405 and 406 and other segments to adjacent pairs of rods to provide a single layer of circumferentially spaced segments, followed by pairs of stacked segments on the rods 404 and 405 and stacked pairs onto the remaining pairs of adjacent rods. A pair of segments are then stacked on the rods 403 and 404, a pair onto the rods 405 and 406 and so on around, followed by pairs onto the rods 404 and 405 and adjacent pairs of rods until a predetermined height is obtained. When all of the segments have been properly assembled and held in place by upsetting the rods, the edges 412, 411, 415, 414, 416 and 417 of the extremity 408' of one segment will respectively register with the edges 424, 420, 419, 422 and 423 of an underlying extremity 409 of a segment and the edges 424, 420, 422 and 423 of an extremity 409 of an overlying segment will respectively register with the edges 412, 411, 415, 414, 416 and 417 of an underlying extremity 408' of a segment. It is, of course, obvious that the edges of a pair of superimposed segments register with one another.

As shown in FIGURES 35, 37, 38 and 39, the lower attaching means 402, the opposed edges 411 and 421 of a pair of segments laid upon said attaching means, and a connecting portion 410 of an overlying segment define a relatively small discharge opening 425. A discharge opening 426 above the opening 425 is defined by the connecting portion 410 of each of the segments in a third layer in combination with the opposed edges 411 and 421 of two upper pairs of segments and the connecting portion of an overlying segment. In view of the foregoing, it will be manifest that additional rows of openings like 426 are provided and they are arranged vertically, horizontally and alternately and extend chordally and diverge outwardly. The edges 422 and 423 of certain segments and the edges 416 and 417 of other segments, and edges of the connection portions 410 of other segments, in combination, define circumferentially spaced substantially continuous vertical tapered relief areas or pockets in advance of the radial edges 418. When the segments are ground, they substantially appear as one integral or composite structure provided with a vertical row of substantially serrated or staggered edges formed by the sharp points 415, circumferentially spaced vertical rows of continuous arcuate surfaces formed by the edges 414 and 419. It will be noted that the radial edges 418 are in vertical rows at the entrance ends of the discharge openings at substantially right angles to lines of force imparted by the blades of the impeller, and that vertical rows of connecting portions 410 provide horizontal cutting edges in conjunction with the radial edges to assist in conditioning and/or slicing the product into pieces. The segments in the annulus 400 are assembled to provide a setup for conditioning and/or slicing a product such as raw meat identified as 427 into very coarse small pieces 428 as shown in FIGURE 37 and rather stringy extruded lengths 429 and pieces 428 as shown in FIGURE 38. Gristle or bone 430 embedded in the meat will also be sliced. Attention is directed to the fact that the long segments 408 serve a purpose similar to the segments 84 except that the openings for the products to exit from the annulus is short to reduce heating of the product.

As alluded to above, FIGURES 40 through 47 exemplify different embodiments or combinations of segments which may be utilized to condition and/or slice various products. More particularly, FIGURE 40, for example, shows an annulus having vertical rows of long segments 500, 501, 502, 503 and 504, and vertical rows of short segments 505, with a short segment interposed between the overlapping extremities of the stacked long segments so that a pair of axially spaced long segments in combination with the opposed extremities of an intervening pair of long segments and pairs of short segments above and below said intervening pair define a discharge opening 506. Thus, a plurality of openings are provided which are disposed horizontally, vertically and alternately with respect to one another.

Figure 41:
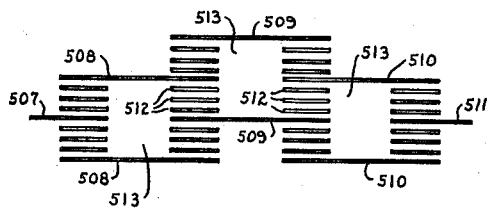

In FIGURE 41 the annulus includes vertical rows of long segments, including rows of segments 507, 508, 509, 510 and 511 and vertical rows of short segments 512. A stack of three short segments are respectively interposed between each pair of overlapped extremities of four associated long segments and in combination therewith define alternately arranged discharge openings such as 513.

Figure 42:
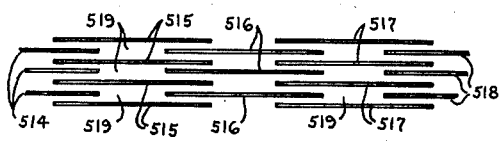

In FIGURE 42 the annulus comprises vertical rows of long segments, including rows of segments 514, 515, 516, 517 and 518 with their extremities disposed in an overlapping relation to define vertical rows of alternately arranged discharge openings such as 519.

Figure 43:
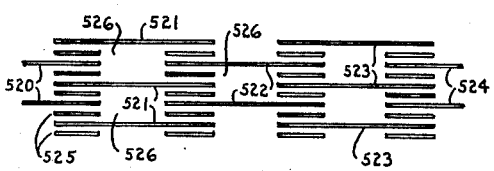

In FIGURE 43 the annulus comprises vertical rows of long segments, including rows of segments 520, 521, 522, 523 and 524 and vertical rows of small segments 525, with the latter respectively interposed between the overlapping extremities of the long segments to define alternately disposed openings such as 526.

Figure 44:
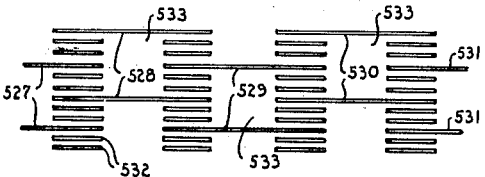

In FIGURE 44 the annulus comprises vertical rows of corresponding long segments, including rows of segments 527, 528, 529, 530 and 531 and vertical rows of short segments 532, of which pairs of the latter are respectively interposed between the overlapping extremities of the long segments to provide discharge openings, such as 533.

Figure 45:
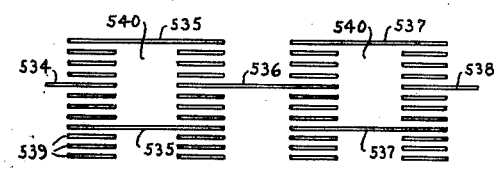

In FIGURE 45, the organization includes circumferentially spaced vertical or axially extending rows of long segments 534, 535, 536, 537 and 538 and rows of short segments 539 to provide openings including the openings 540. The setup substantially corresponds to the one illustrated in FIGURE 41, except that two lower long segments are omitted.

Figure 46:
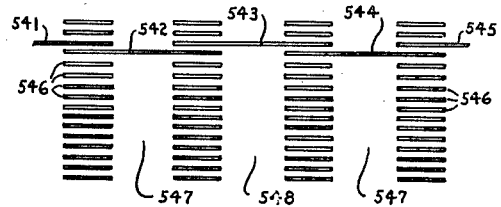

In FIGURE 46, the annulus comprises vertical rows of corresponding long segments, including rows of segments 541, 542, 543, 544 and 545, with their extremities overlapped and vertical rows containing appreciable numbers of corresponding short segments such as 546 respectively disposed above and below said overlapped extremities to define openings such as 547 and 548.

Figure 47:
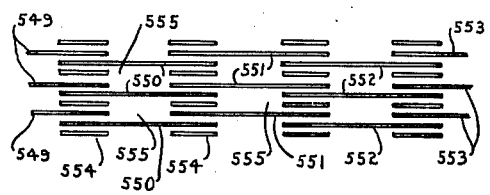

In FIGURE 47, the annulus comprises vertical rows of corresponding long segments, including rows of segments 459, 550, 551, 552 and 553, with their extremities disposed for overlapping engagement and vertical rows of corresponding short segments 554, with a single short segment arranged between said extremities to define openings such as 555.

In all of the above described annuluses, there are two separate types of cutting. When the axis of each annulus is disposed vertically there is provided sharp vertical cutting edges, all of which are substantially identical, with substantially corresponding rake angles and horizontal cutting edges of various styles which may be sharp, notched, saw-toothed arcuate having a radius at the center or the annulus, or arcuate surfaces departing from such radius. The horizontal cutting edges may be unsharpened and yet cut, due to the centrifugal force many thousand times gravity or by impact at high surface speed provided by the machine disclosed herein.

In view of the foregoing, it will be manifest that each of the annuluses is comprised of circumferentially spaced axially extending rows of corresponding or different forms of segments which are secured together in layers with the segments in adjacent layers being disposed in an overlapping relationship in a manner whereby to define such rows, including circumferentially spaced axially extending rows of chordally disposed discharge openings.

Of further significance is the fact that all of the segments are preferably stamped or cut from sheet metal stock and that each segment is planar and provided with a pair of holes or apertures for respectively receiving a rod and brazing material. Also, that certain annuluses or mills may be constructed by utilizing one type of segment while others may include two types or forms and that in all of the various combinations to which the invention is susceptible, the segments are preferably bonded together to provide a composite or unitized stable structure. It will be further evident that the staggered or alternately arranged openings and the various cutting edges operatively associated with the openings serve to efficiently condition and/or slice the product at a multitude of different locations for expeditious discharge or release. It is also important to note that certain of various long types of segments are preferably provided with a pair of cutting edges and notches to afford relief while at least another long type is provided with a single continuous arcuate cutting edge. It is also evident that the other forms or types of short segments may be constructed as depicted to provide at least one cutting edge or point.

It will also be manifest that segments or knives constituting components of each of the annuluses serve to cleanly cut various products as distinguished from those machines which produce a crushing and/or rubbing action. Furthermore, the structure is such that a minimum of power is required to operate the machine.

The invention embodied in one or more annuluses can reduce many vegetables, fruits and nuts to predetermined size pieces and can also reduce many of these to a puree or a paste. Products such as hard cheese can be reduced with low temperature rise into shreds or powder. The free cutting action of the mill causes many products to be discharged in a fluffy state. Because of the absence of the crushing action above referred to, some relatively wet products are discharged in a loose and readily flowable manner.

Having thus described my invention, it is obvious that various modifications may be made in the same without departing from the spirit of the invention, and therefore, I do not wish to be understood as limiting myself to the exact forms, constructions, arrangements, and combinations of parts herein shown and described.

I claim:

1. An assembly constituting a component of a machine adapted for reducing the size of a product, said assembly comprising a tubular cylindrical wall structure, said wall structure comprising superimposed engaged layers of circumferentially spaced segments which are overlapped so that certain portions thereof define sides of openings extending generally tangentially through said structure in the direction that a reduced product is adapted to flow and other portions between said certain portions define axially spaced ends of said openings, the arrangement being such that said segments serve to reduce the size of a product when forcibly directed thereagainst.

2. A cutter assembly of the kind described comprising a tubular cylindrical wall structure, said wall structure comprising engaged layers of circumferentially spaced segments with the segments in certain layers overlapping the segments in adjacent layers to define openings extending generally tangentially in the direction that a cut product is adapted to flow, each of said segments being provided with a cutting edge disposed adjacent an opening, and means carried by at least one end of said wall structure for reinforcing the same and facilitating its connection to a support.

3. A tubular cylindrical wall structure for use in a machine for cutting a product, said structure being comprised of stacked circumferentially spaced segments of different lengths defining openings extending generally tangentially in the direction that a cut product is adapted to flow and having cutting edges adjacent to said openings, and means permanently joining said segments in engaging relationship.

4. A tubular cylindrical wall structure for use in a machine for cutting a product, said structure comprising superimposed assembled layers of differently arranged engaged segments, said segments being circumferentially spaced apart in each layer and defining circumferentially spaced openings extending generally tangentially in the direction that a cut product is adapted to flow, and at least certain of said segments having cutting edges forming margins of said openings.

5. A tubular cylindrical wall structure for use in a machine for cutting a product, said structure comprising a plurality of axially, circumferentially and alternately arranged openings and cutting edges, said openings and said cutting edges being defined by layers of circumferentially engaged segments permanently assembled, said openings extending generally tangentially in the direction that a cut product is adapted to flow.

6. A cutter structure of the kind described, said structure being tubular and cylindrical and comprised of a plurality of stacked engaged layers of circumferentially spaced segments, and certain of said segments at least in some layers being arranged in overlapping relation with segments in other layers to provide variably sized openings extending through such structure generally tangentially in the direction that the cut product is adapted to flow, said structure also having internal cutting edges adjacent said openings.

7. The structure defined in claim 6, in which all of the segments are respectively provided with inner arcuate edges and certain of said segments are also provided with edges which are angled toward said openings.

8. A tubular cylindrical wall structure for use in a machine for reducing the size of a product, said structure being comprised of superimposed engaged layers of circumferentially spaced segments, said segments being disposed in an overlapping relation to define openings extending through said structure and having inner edges for reducing the size of a product adapted to be forcibly directed thereagainst, and said openings diverging outwardly and generally tangentially in the direction that the product when reduced in size is adapted to flow.

9. A tubular cylindrical wall structure for use in a machine for reducing the size of a product, said structure comprising superimposed engaged layers of circumferentially spaced segments, said segments being arranged in an overlapping relation to define openings extending through said structure and having edges for reducing the size of a product adapted to be forcibly directed thereagainst, said openings diverging outwardly and generally tangentially in the direction that the product when sized is adapted to flow, and means extending through said segments for holding them assembled.

10. An assembly for slicing a product, said assembly comprising a tubular cylindrical wall structure provided with openings extending therethrough, an impeller rotatable in the structure for forcing a product outwardly and generally tangentially through said openings, and said wall structure comprising layers of circumferentially spaced overlapping engaged segments defining circumferentially spaced axially extending rows of said openings with the openings being alternately disposed in adjacent rows.

11. The assembly defined in claim 10, in which the segments are provided with cutting edges defining axial rows thereof located adjacent said openings and with other edges defining circumferentially spaced axially extending relief areas respectively directed toward said openings.

12. The assembly defined in claim 10, in which the segments are provided with cutting edges defining axially extending rows thereof located adjacent said openings and portions of certain segments define axially extending rows of radially disposed cutting edges.

13. In combination, a pair of annular attaching means, stacked rows of segments interposed between said attaching means and forming a cylindrical wall structure provided with openings extending therethrough and cutting edges adjacent said openings, said openings extending generally tangentially in the direction that the cut product is adapted to flow, and means extending through said segments and said attaching means for holding these components assembled and said segments engaged.

14. Structure for use with an impeller for cutting sliceable material into fragments, said structure having a material receiving chamber comprising a cylindrical lattice wall including individual planar segments defining longitudinal knife structures spaced apart circumferentially about the principal axis of the chamber and chamber-circumscribing knife structures spaced apart axially of the chamber, said segments being engaged and having respective cutting edges collectively constituting portions of the inner periphery of the lattice wall and portions defining openings extending generally tangentially in the direction that the cut product is adapted to flow laterally from the chamber.

15. Structure for use with an impeller for cutting sliceable material into fragments, said structure having a material receiving chamber comprising a cylindrical lattice wall including planar segments defining longitudinal knife structures spaced apart circumferentially about the principal axis of the chamber, and chamber-circumscribing knife structures spaced apart axially of the chamber, said segments being engaged and having respective cutting edges collectively constituting the inner periphery of the lattice wall, the longitudinal knife structures being disposed substantially tangentially of said periphery and presenting their cutting edges in the same direction circumferentially of said periphery, and said wall being provided with discharge openings formed by said segments which extend therethrough between the knife structures.

16. A cylinder comprised of superimposed layers of engaged long segments and short segments, certain long segments being disposed in circumferentially spaced pairs to constitute first and second layers, certain short segments being disposed in a circumferentially spaced relation to define a third layer with a pair thereof engaging each of the long segments of said second layer, additional circumferentially spaced pairs of long segments constituting fourth and fifth layers with the ends of those of the fourth layer engaging a pair of said short segments, and additional circumferentially spaced short segments constituting a sixth layer with a pair thereof engaging the ends of the long segments of said fifth layer, the arrangement being such that the portions of the segments define openings extending through the annulus and other portions define cutting edges adjacent said openings.

17. A tubular cylindrical wall structure for use in a machine for cutting a product, said structure comprising circumferentially spaced axially extending rows of engaged short segments defining circumferentially spaced openings extending through said wall structure, and circumferentially spaced axially extending rows of engaged long segments interposed between certain adjacent pairs of short segments, said long segments having portions extending across said openings and portions which serve as cutting edges for reducing the size of a product adapted to be forcibly directed thereagainst.

18. The wall structure defined in claim 17, in which the said portions of said long segments are relatively narrow and extend chordally with respect to the center of such structure.

19. A segment for the use described, said segment being elongate, planar and generally arcuate in shape, said segment being provided with an outer marginal edge, a pair of angularly disposed marginal end edges and inner structure, said inner structure being provided with a pair of circumferentially spaced arcuate edges, one of said arcuate edges and one of said end edges intersecting to define a sharp point, and an angularly disposed cutting edge interposed between said arcuate edges and intersecting the other of said arcuate edges.

20. A tubular cylindrical wall structure for use in a machine for reducing the size of a product, said wall structure comprising layers of circumferentially spaced long segments and layers of circumferentially spaced short segments respectively stacked in axially extending rows, said long segments having edges and said short segments having edges coinciding to define sides of an opening extending through the wall structure, and said long segments having other edges and said short segments having other edges which coincide to define an adjacent corresponding opening, said long segments also having edges for reducing the size of a product adapted to be forcibly directed against.

21. A cylindrical wall for cutting a product, said structure comprising circumferentially spaced axially extending rows of stacked overlapping corresponding segments defining openings extending through the wall structure and axially spaced radial cutting edges extending across said openings, said openings extending generally tangentially in the direction that a cut product is adapted to flow.

22. An assembly for reducing the size of a product, said assembly comprising a tubular cylindrical wall structure having inner and outer annular peripheries, said wall structure comprising engaged layers of circumferentially spaced segments which are overlapped in alternate layers so that the trailing edge of each segment becomes the leading edge of openings through said wall structure and the leading edge of each segment is sharpened to a point and forms the trailing edge of openings through said wall structure.

23. A tubular cylindrical wall structure for use in a machine for reducing the size of a product, said wall structure comprising a first layer of circumferentially spaced long segments, a second layer of circumferentially spaced long segments spaced so that their ends overlap and engage the ends of the segments in the first layer, a third layer of circumferentially spaced short segments with their area, shape and circumferential spacing corresponding to the overlapped portions of the first and second layers, a fourth layer of long segments corresponding in circumferential spacing to the first layer, a fifth layer of long segments corresponding in circumferential spacing to the second layer, and a sixth layer of short segments corresponding in circumferential spacing to the third layer.

24. The wall structure defined in claim 23, in which the long and short segments have leading edges which are sharpened to points which form the trailing ends of openings through the wall structure.

25. The wall structure defined in claim 23, in which the short and long segments having leading edges and the leading edges of one-half of the short segments correspond in circumferential alignment with one half of the leading edges of one-half of the long segments, and the leading edges of the other half of the short segments correspond in circumferential alignment with the other half of the leading edges of the long segments.

26. The wall structure defined in claim 5 in which said openings also diverge outwardly.

27. A tubular cylindrical wall structure for use in a machine for cutting a product, said structure being comprised of stacked circumferentially spaced segments defining openings which extend generally tangentially in a direction that a cut product is adapted to flow and cutting edges adjacent said openings, and means assisting to permanently join said segments in engaging relationship, said means including a plurality of circumferentially spaced rods extending axially through the segments, brazing material extending through the segments, and a pair of annular means respectively engaging the ends of said wall structure and connected to said rods whereby to facilitate clamping of the segments and holding the brazing material in place preparatory to subjecting the complete structure to heat treatment.

References Cited by the Examiner

UNITED STATES PATENTS

| | | | |
|---|---|---|---|
| 134,619 | 1/73 | Vandegrift | 146—275 |
| 145,485 | 12/73 | Brooks | 30—313 |
| 277,790 | 5/83 | Saint Requier | 241—275 X |
| 490,179 | 1/93 | Van Mater | 146—82 |
| 1,335,465 | 3/20 | Sparks | 146—126 X |
| 1,336,991 | 4/20 | Urschel | 146—86 |
| 1,881,908 | 10/32 | Papac | 146—165 |
| 2,141,662 | 12/38 | Ossing et al. | 241—90 |
| 2,195,879 | 4/40 | Urschel et al. | 146—165 |
| 2,416,043 | 2/47 | Bucher-Guyer | 146—165 X |
| 2,476,356 | 7/49 | Cook | 146—2 |
| 2,678,571 | 5/54 | Booth | 76—101 |
| 2,787,174 | 4/57 | Hyde | 76—104 |
| 2,875,800 | 3/59 | Urschel | 146—165 X |
| 2,919,734 | 1/60 | Turner | 146—78 |
| 3,036,611 | 5/62 | Reuter | 146—2 |

ROBERT C. RIORDON, *Primary Examiner.*

CARL W. ROBINSON, J. SPENCER OVERHOLSER,
*Examiners.*